(12) United States Patent
Brown

(10) Patent No.: US 9,235,700 B1
(45) Date of Patent: ***Jan. 12, 2016

(54) HYBRID DEVICE HAVING A PERSONAL DIGITAL KEY AND RECEIVER-DECODER CIRCUIT AND METHODS OF USE

(71) Applicant: Proxense, LLC, Bend, OR (US)

(72) Inventor: David L. Brown, Jupiter, FL (US)

(73) Assignee: Proxense, LLC, Bend, OR (US)

(*) Notice: Subject to any disclaimer, the term of this patent is extended or adjusted under 35 U.S.C. 154(b) by 0 days.

This patent is subject to a terminal disclaimer.

(21) Appl. No.: 14/677,893

(22) Filed: Apr. 2, 2015

Related U.S. Application Data

(63) Continuation of application No. 14/171,705, filed on Feb. 3, 2014, now Pat. No. 9,049,188, which is a continuation of application No. 13/445,825, filed on Apr. 12, 2012, now Pat. No. 8,646,042, which is a continuation of application No. 12/329,329, filed on Dec. 5, 2008, now Pat. No. 8,171,528.

(60) Provisional application No. 60/992,953, filed on Dec. 6, 2007.

(51) Int. Cl.
| | |
|---|---|
| G06F 21/00 | (2013.01) |
| G06F 21/35 | (2013.01) |
| H04L 29/08 | (2006.01) |
| G06F 21/32 | (2013.01) |
| H04L 29/06 | (2006.01) |
| H04W 12/06 | (2009.01) |
| H04W 12/08 | (2009.01) |

(52) U.S. Cl.
CPC ............... *G06F 21/35* (2013.01); *G06F 21/32* (2013.01); *H04L 63/0853* (2013.01); *H04L 63/0861* (2013.01); *H04L 67/10* (2013.01); *H04W 12/06* (2013.01); *H04W 12/08* (2013.01)

(58) Field of Classification Search
USPC .......................................................... 726/3
See application file for complete search history.

(56) References Cited

U.S. PATENT DOCUMENTS

2007/0271194 A1* 11/2007 Walker ................. G06Q 50/188
705/80

* cited by examiner

*Primary Examiner* — Jason Lee
(74) *Attorney, Agent, or Firm* — Patent Law Works LLP

(57) ABSTRACT

A hybrid device includes a personal digital key (PDK) and a receiver-decoder circuit (RDC). The PDK and RDC of the hybrid device are coupled for communication with each other. In one embodiment, the hybrid device also provides a physical interconnect for connecting to other devices to send and receive control signals and data, and receive power. The hybrid device operates in one of several modes including, PDK only, RDC only, or PDK and RDC. This allows a variety of system configurations for mixed operation including: PDK/RDC, RDC/RDC or PDK/PDK. The present invention also includes a number of system configurations for use of the hybrid device including: use of the hybrid device in a cell phone; simultaneous use of the PDK and the RDC functionality of hybrid device; use of multiple links of hybrid device to generate an authorization signal, use of multiple PDK links to the hybrid device to generate an authorization signal; and use of the hybrid device for authorization inheritance.

20 Claims, 15 Drawing Sheets

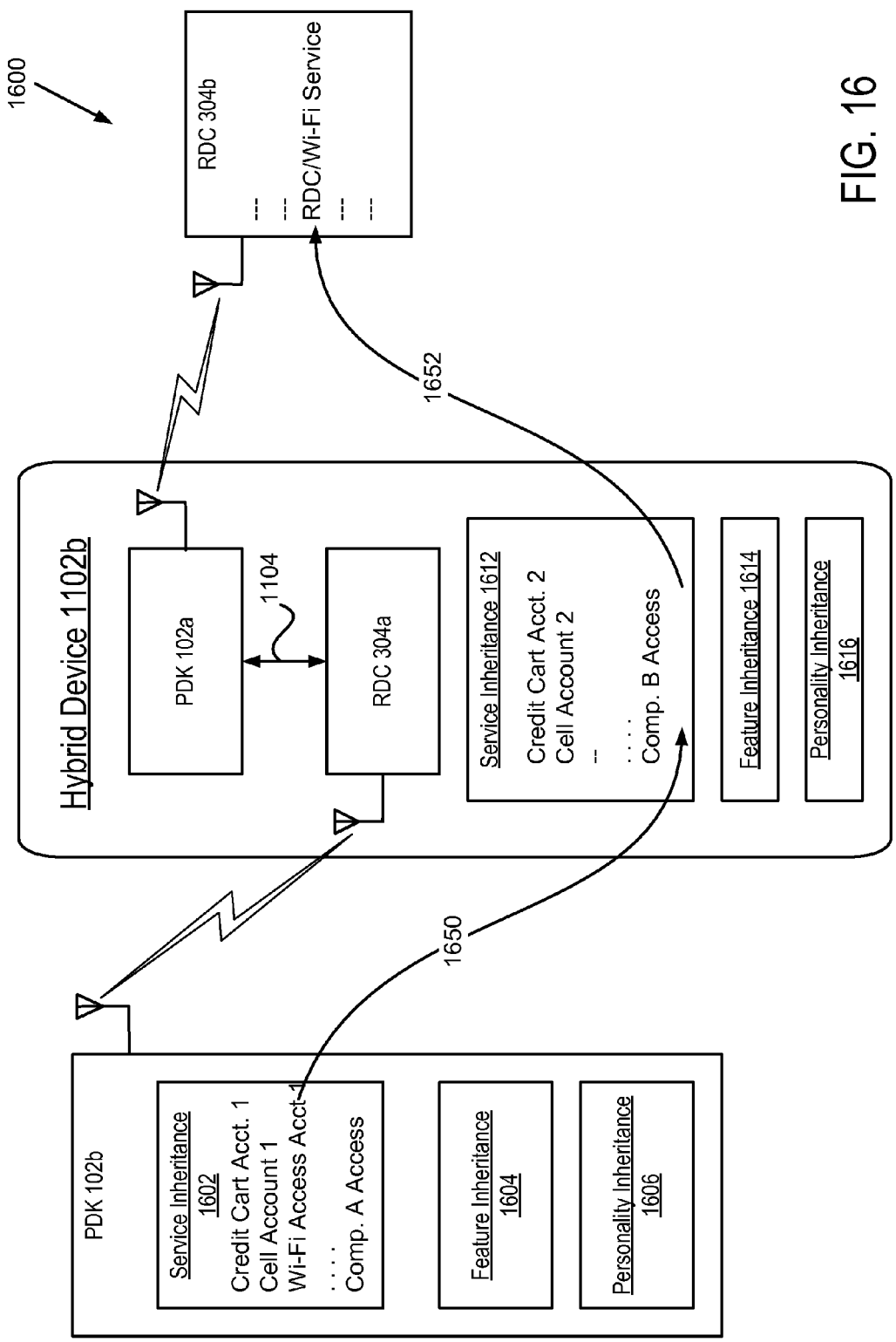

HYBRID DEVICE HAVING A PERSONAL DIGITAL KEY AND RECEIVER-DECODER CIRCUIT AND METHODS OF USE

CROSS-REFERENCE TO RELATED APPLICATIONS

The present application claims priority under 35 U.S.C. §120 to U.S. patent application Ser. No. 14/171,705 entitled "Hybrid Device Having a Personal Digital Key and Receiver Decoder Circuit and Method of Use," filed Feb. 3, 2014, which claims priority under 35 U.S.C. §120 to U.S. patent application Ser. No. 13/445,825 entitled "Hybrid Device Having a Personal Digital Key and Receiver Decoder Circuit and Method of Use," filed Apr. 12, 2012, now U.S. Pat. No. 8,646,042, which claims priority under 35 U.S.C. §120 to U.S. patent application Ser. No. 12/329,329 entitled "Hybrid Device Having a Personal Digital Key and Receiver Decoder Circuit and Method of Use," filed Dec. 5, 2008, now U.S. Pat. No. 8,171,528, which claims the benefit of priority under 35 U.S.C. §119(e) of U.S. Provisional Application No. 60/992,953 entitled "Reverse Prox," filed on Dec. 6, 2007 by David L. Brown, John J. Giobbi and Fred S. Hirt. The entire contents of all of the foregoing are incorporated by reference herein.

Applicants hereby notify the USPTO that the claims of the present application are different from those of the aforementioned related applications. Therefore, Applicant rescinds any disclaimer of claim scope made in the parent application, grandparent application or any other predecessor application in relation to the present application. The Examiner is therefore advised that any such disclaimer and the cited reference that it was made to avoid may need to be revisited at this time. Furthermore, the Examiner is also reminded that any disclaimer made in the present application should not be read into or against the parent application, the grandparent application or any other related application.

BACKGROUND

1. Field of Art

The invention generally relates to personal digital keys and corresponding sensors, capable of proximity detection/location determination and auxiliary data services/application services. Still more particularly, the present invention relates to a hybrid device including a personal digital key (PDK) and a receiver-decoder circuit (RDC) and methods for using same.

2. Description of the Related Art

Proximity sensors and location tracking are technologies with many applications. For example, proximity sensors can be used to provide secure access to physical and/or digital assets, based on biometrics, passwords, PINS, or other types of authentication. Proximity sensors typically have advantages of being less cumbersome, easier to use, and more flexible in form factor and implementation. Proximity sensors can be used to control access to resources and/or to authenticate individuals, for example.

One possible application that can take advantage of proximity sensors is location tracking RFID tracking is one example. In RFID, RFID tags are attached to objects to be tracked. RFID readers then interact with the RFID tags to determine the location of the tag. Regardless of how it is accomplished, location tracking (i.e., knowledge about the location of an object or person) is generally useful. For example, location tracking information can be used to track inventory and trace the route of objects through various locations. It can be used for time and motion studies. If tags are attached to people, then tracking of people can be used to better understand their behavior. Knowledge about a person's location (and/or their past locations and projected future locations) could be used to provide better services to that person.

However, most proximity systems and location tracking systems have limited capabilities. Typically, the proximity sensor, RFID tag or similar device is a dumb device, in the sense that the device is designed and has the capability only to report its location. For example, such devices typically do not have the capabilities to run different applications or to even interact with different applications. Furthermore, these systems typically are proprietary and narrowly tailored for a specific situation, thus preventing easy expandability to other situations or third party applications.

SUMMARY

Various drawbacks of the prior art are overcome by providing a hybrid device including a personal digital key (PDK) and a receiver-decoder circuit (RDC). The PDK and RDC of the hybrid device are coupled for communication with each other. In one embodiment, the hybrid device also provides a physical interconnect for connecting to other devices to send and receive control signals and data, and receive power. The hybrid device operates in one of several modes including, PDK only, RDC only, or PDK and RDC. This allows a variety of system configurations for mixed operation including: PDK/RDC, RDC/RDC or PDK/PDK. The present invention also includes a number of system configurations for use of the hybrid device including: use of the hybrid device in a cell phone; simultaneous use of the PDK and the RDC functionality of hybrid device; use of multiple links of hybrid device to generate an authorization signal, use of multiple PDK links to the hybrid device to generate an authorization signal; use of the hybrid device for authorization inheritance and use of the hybrid device for automatically disabling a service or feature.

Other aspects of the invention include systems and components corresponding to the above, and methods corresponding to all of the foregoing.

BRIEF DESCRIPTION OF THE FIGURES

FIG. 16 is a block diagram of one embodiment of a system using the hybrid device for authorization inheritance in accordance with the present invention.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
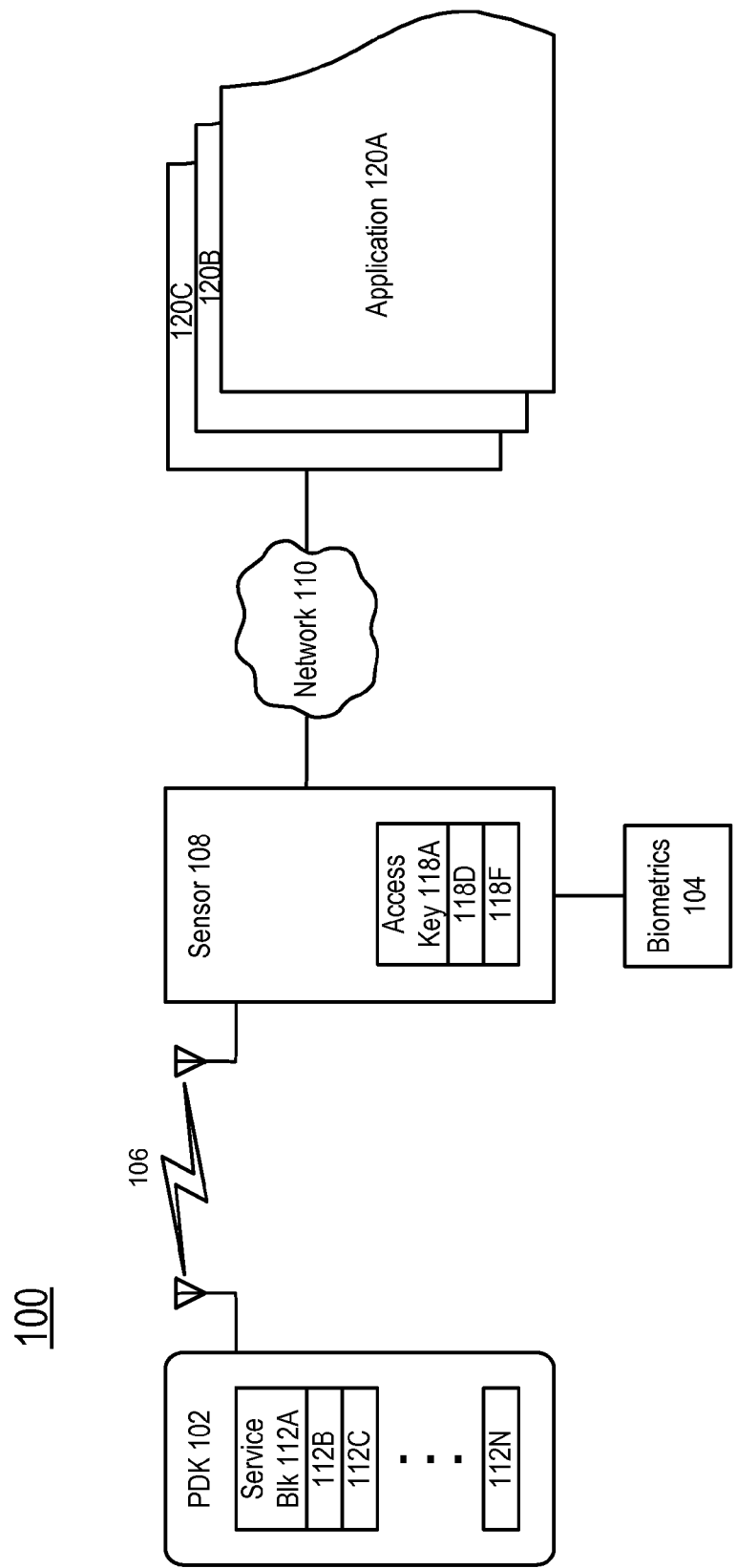
FIG. 1 is a block diagram illustrating one embodiment of a system according to the invention.

FIG. 1 is a high level block diagram illustrating a system for allowing access to multiple applications (or services). The system 100 comprises a Personal Digital Key (PDK) 102, a sensor 108, a network 110 and one or more applications 120 (including services). The sensor 108 is coupled to the PDK 102 by a wireless link 106 and coupled to a network 110 by either a wired or wireless link. In this example, the applications 120 are also accessed over network 110. The sensor 108 is also adapted to receive a biometric input 104 from a user and is capable of displaying status to a user. In alternative embodiments, different or additional resources and databases may be coupled to the network 110, including for example registries and databases used for validation or to check various registrations of the user. In another embodiment, the sensor 108 operates as a standalone device without a connection to the network 110.

Figure 2:
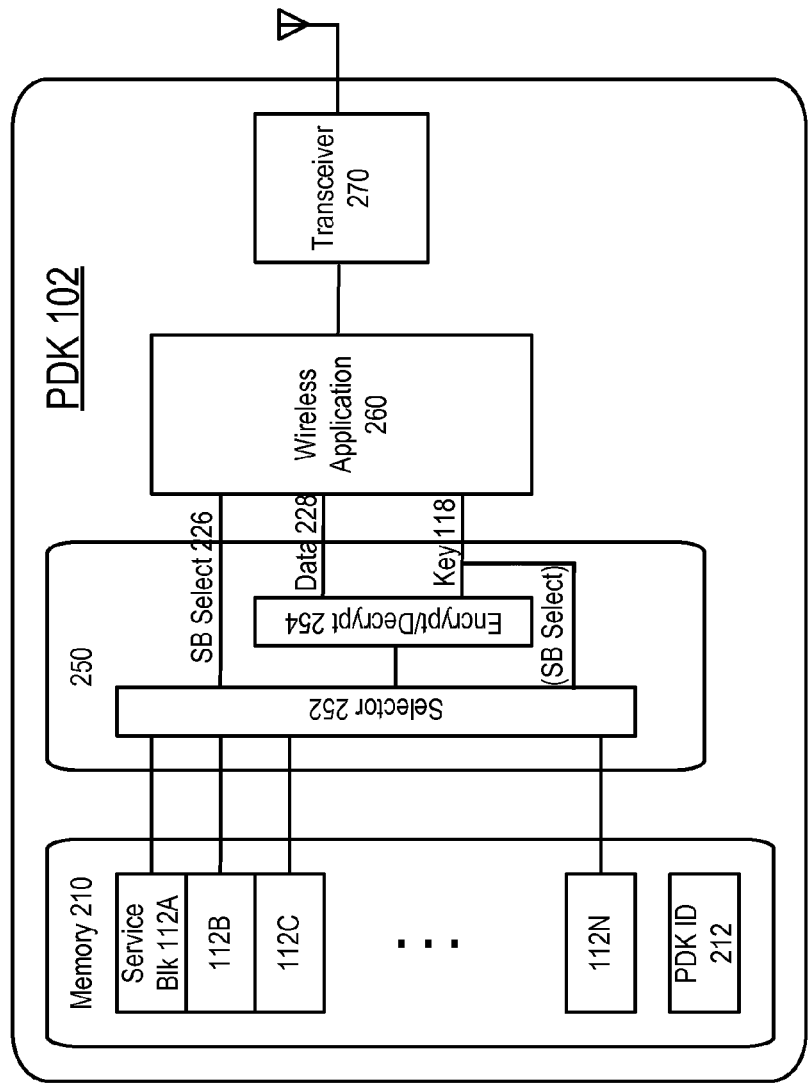
FIG. 2 is a block diagram illustrating one embodiment of a Personal Digital Key (PDK).

The PDK 102 includes multiple service blocks 112A-N as described in more detail in FIG. 2. Each service block 112 is accessed using a corresponding service block access key 118. In this example, the sensor 108 contains three of the service block access keys 118A, D, F. The service block access keys 118 allow the sensor 108 to unlock information stored in the corresponding service blocks 112, which information is used as local secured information.

In one example, a biometric is required in order to access specific service blocks 112 in the PDK 102. Verification of the biometric is achieved by using service block 112A. The sensor 108 stores the corresponding service block access key 118A and uses this key to unlock the biometric service block 112A, which stores a valid biometric. A current biometric is received using biometric input 104. The sensor 108 then verifies the stored biometric (from service block 112A) against the recently acquired biometric (from input 104). Upon proper verification, various applications 120 are permitted to connect to the PDK 102 via the sensor 108 and/or to gain access to other service blocks 112.

The system 100 can be used to address applications 120 where it is important to authenticate an individual for use. Generally, the sensor 108 wirelessly receives information stored in the PDK 102 that uniquely identifies the PDK 102 and the individual carrying the PDK 102. The sensor 108 can also receive a biometric input 104 from the individual. Based on the received information, the sensor 108 determines if access to the application 120 should be granted. In this example, the system 100 provides authentication without the need for PINs or passwords (although PINs and passwords may be used in other implementations). Moreover, personal biometric information need not be stored in any local or remote storage database and is only stored on the user's own PDK (in one embodiment).

The credibility of the system 100 is ensured by the use of a PDK 102 that stores trusted information. The PDK 102 is a compact, portable uniquely identifiable wireless device typically carried by an individual. The PDK 102 stores digital information in a tamper-proof format that uniquely associates the PDK 102 with an individual. Example embodiments of PDKs are described in more detail in U.S. patent application Ser. No. 11/292,330, entitled "Personal Digital Key And Receiver/Decoder Circuit System And Method" filed on Nov. 30, 2005; U.S. patent application Ser. No. 11/620,581 entitled "Wireless Network Synchronization Of Cells And Client Devices On A Network" filed on Jan. 5, 2007; and U.S. patent application Ser. No. 11/620,577 entitled "Dynamic Real-Time Tiered Client Access" filed on Jan. 5, 2007, the entire contents of which are all incorporated herein by reference.

The sensor 108 wirelessly communicates with the PDK 102 when the PDK 102 is within a proximity zone (i.e., within a microcell) of the sensor 108. The proximity zone can be, for example, several meters in radius and preferably can be adjusted dynamically by the sensor 108. Thus, in contrast to many conventional RF ID devices, the sensor 108 can detect and communicate with the PDK 102 without requiring the owner to remove the PDK 102 from his/her pocket, wallet, purse, etc. Generally, the sensor 108 receives uniquely identifying information from the PDK 102 and initiates an authentication process for the individual carrying the PDK 102. In one embodiment, the sensor 108 is adapted to receive a biometric input 104 from the individual. The biometric input 104 comprises a representation of physical or behavioral characteristics unique to the individual. For example, the biometric input 104 can include a fingerprint, a palm print, a retinal scan, an iris scan, a photograph, a signature, a voice sample or any other biometric information such as DNA, RNA or their derivatives that can uniquely identify the individual. The sensor 108 compares the biometric input 104 to information received from the PDK 102 to determine authentication. Alternatively, the biometric input 104 can be obtained by a biometric sensor on the PDK 102 and transmitted to the sensor 108 for authentication. In additional alternative embodiment, some or all of the authentication process can be performed by the PDK 102 instead of the sensor 108.

In this example, the sensor 108 is further communicatively coupled to the network 110 in order to receive and/or transmit information to remote databases for remote authentication. In an alternative embodiment, the sensor 108 includes a non-volatile data storage that can be synchronized with one or more remote databases or registries. Such an embodiment alleviates the need for a continuous connection to the network 110 and allows the sensor 108 to operate in a standalone mode and for the local data storage to be updated when a connection is available. For example, a standalone sensor 108 can periodically download updated registry entries and perform authentication locally without any remote lookup.

In yet another alternative, a standalone sensor 108 may have a pre-configured secure access key 118 and encryption algorithm, or a variable access key 118 that changes, for example based on time and sensor ID. One example application would be a sensor 108 located in a hotel room door, where the sensor could constantly compute a different access key 118 based on time, and the PDK 102 could be associated with this key during the hotel registration process.

The network 110 provides communication between the sensor 108 and various validation databases and/or registries, in addition to the applications 120. In one embodiment, the network 110 uses standard communications technologies and/or protocols. Thus, the network 110 can include links using technologies such as Ethernet, 802.11, 802.16, integrated services digital network (ISDN), digital subscriber line (DSL), asynchronous transfer mode (ATM), etc. Similarly, the networking protocols used on the network 110 can include the transmission control protocol/Internet protocol (TCP/IP), the hypertext transport protocol (HTTP), the simple mail transfer protocol (SMTP), the file transfer protocol (FTP), etc. The data exchanged over the network 110 can be represented using technologies and/or formats including the hypertext markup language (HTML), the extensible markup language (XML), etc. In addition, all or some of links can be encrypted using conventional encryption technologies such as the secure sockets layer (SSL), Secure HTTP and/or virtual private networks (VPNs). In another embodiment, the entities can use custom and/or dedicated data communications technologies instead of, or in addition to, the ones described above.

In one aspect, the sensor 108 may connect to a validation database that stores additional information that may be used for authorizing a transaction to be processed at the sensor. For example, in purchase transactions, the sensor 108 may interact with a credit card validation database that is separate from the merchant providing the sale. Alternatively, a different database may be used to validate different types of purchasing means such as a debit card, ATM card, or bank account number.

In another aspect, the sensor 108 may connect to various registries that store, among other items, PDK, notary, and/or sensor information. In one embodiment, a registry stores biometric or other types of information in an encoded format that can only be recovered using an algorithm or encoding key stored in the PDK. Information stored in the registries can be accessed by the sensor 108 via the network 110 for use in the authentication process. Two basic types of registries are private registries and a Central Registry. Private registries are generally established and administered by their controlling entities (e.g., a merchant, business authority, or other entity administering authentication). Private registries can be custom configured to meet the specialized and independent needs of each controlling entity. A Central Registry is a highly-secured, centrally-located database administered by a trusted third-party organization. In one embodiment, all PDKs 102 are registered with the Central Registry and may be optionally registered with one or more selected private registries. In alternative embodiments, a different number or different types of registries may be coupled to the network 110.

The service blocks 112 can be used for purposes other than user authentication. For example, information used or produced by an application 120 can be transferred back and forth to the corresponding service block 112. That is, each service block 112 can be used as a local secure memory for the corresponding application 120. Thus, a service 120B may store certain sensitive information in service block 112B, and a separate service 120C will not be able to access that information without the corresponding access key 118B. In this example, the sensor 108 only holds access keys 118A, D, F and does not hold access key 118B. The application 120B may hold the access key 118B, thus allowing it to access service block 112B but preventing application 120C from accessing the service block 112B. Note that this implementation would also prevent the sensor 108 acting alone from accessing the service block 112B.

Turning now to FIG. 2, an example embodiment of a PDK 102 is illustrated. The PDK 102 comprises a memory 210, control logic 250, wireless application 260 and a transceiver 270. The PDK 102 can be standalone as a portable, physical device or can be integrated into commonly carried items. For example, a PDK 102 can be integrated into a portable electronic device such as a cell phone, Personal Digital Assistant (PDA), or GPS unit, an employee identification tag, clothing, or jewelry items such as watches, rings, necklaces or bracelets. In one embodiment, the PDK 102 can be, for example, about the size of a Subscriber Identity Module (SIM) card and be as small as a square inch in area or less. In another embodiment, the PDK 102 can be easily contained in a pocket, on a keychain, or in a wallet. The PDK can also contain other components not shown, for example various other inputs, outputs and/or interfaces (serial or parallel).

The memory 210 can be a read-only memory, a once-programmable memory, a read/write memory or any combination of memory types, including physical access secured and tamperproof memories. The memory 210 typically stores a unique PDK ID 212. The PDK ID 212 comprises a public section and a private section of information, each of which can be used for identification and authentication. In one embodiment, the PDK ID 212 is stored in a read-only format that cannot be changed subsequent to manufacture. The PDK ID 212 is used as an identifying feature of a PDK 102 and distinguishes between PDKs 102 in private or Central registry entries. In an alternative embodiment, the registries can identify a PDK 102 by a different ID than the PDK ID 212 stored in the PDK 102, or may use both the PDK ID 212 and the different ID in conjunction. The PDK ID 212 can also be used in basic PDK authentication to ensure that the PDK 102 is a valid device.

The memory 210 also stores the various service blocks 112A-N. Whether a particular service block 112 is stored in volatile or non-volatile memory may be determined by the specific application. In one approach, the original issuer of the PDK defines how the internal memory 210 may be used for service blocks 112. In some cases, the issuer may choose to only allow their service blocks to be stored, in which case third party applications will not be able to store service blocks in memory 210. In other cases, the issuer may allow any third party service 120 to use available service blocks 112. If a new service block is created, then memory for that service block is allocated. The specific location of the service block and generation of the corresponding service block access key can be handled by the PDK 102, or can be handled via an external service.

Regardless of how created, once created, external applications (such as applications 120 in FIG. 1) can gain access to a specific service block 112 by proving the corresponding access key 118. In FIG. 2, this is shown conceptually by control logic 250. The wireless application 260 on the PDK 102 communicates to the sensor (not shown in FIG. 2) via transceiver 270. The wireless application provides a service block select 226 and a service block access key 118 in order to store, retrieve and/or modify data in a service block 112. The selector 252 selects a service block 112 based on the select signal 226 and the access key 118. The encryption engine 254 encrypts/decrypts data 228 flowing to/from the service block 112 based on the access key 118 (or some other key generated based on the access key, for example a session key). In an alternate method, the service block 112 may be selected based on the service block access key 118, eliminating the need for a separate select signal 226.

The PDK 102 may also include other data and applications. For example, the PDK 102 typically will include various profiles. Many different types of profiles are possible. A biometric profile, for example, includes profile data representing physical and/or behavioral information that can uniquely identify the PDK owner. A PDK 102 can store multiple biometric profiles, each comprising a different type of biometric information. The same biometric information can also be stored multiple times in a PDK 102. For example, two different applications may use the right index fingerprint, and that biometric information may be stored in two different service blocks, one for each application. In addition, the PDK 102 may also store one or more biometric profile "samples" associated with each biometric profile. Profiles may also store one or more PINS or passwords associated with the PDK owner, or one or more pictures of the PDK owner. A profile can further include personal identification information such as name, address, phone number, etc., bank information, credit/debit card information, or membership information. This information can be useful for transactions.

The transceiver 270 is a wireless transmitter and receiver for wirelessly communicating with a sensor 108 or other wireless device. The transceiver 270 can send and receive data as modulated electromagnetic signals. Moreover, the data can be encrypted by the transceiver 270 and transmitted over a secure link. Further, the transceiver 270 can actively send connection requests, or can passively detect connection requests from another wireless source. In one embodiment, the transceiver 270 is adapted to communicate over a range of up to around 5 meters. In another embodiment, the transceiver 270 range can be varied.

Figure 3:
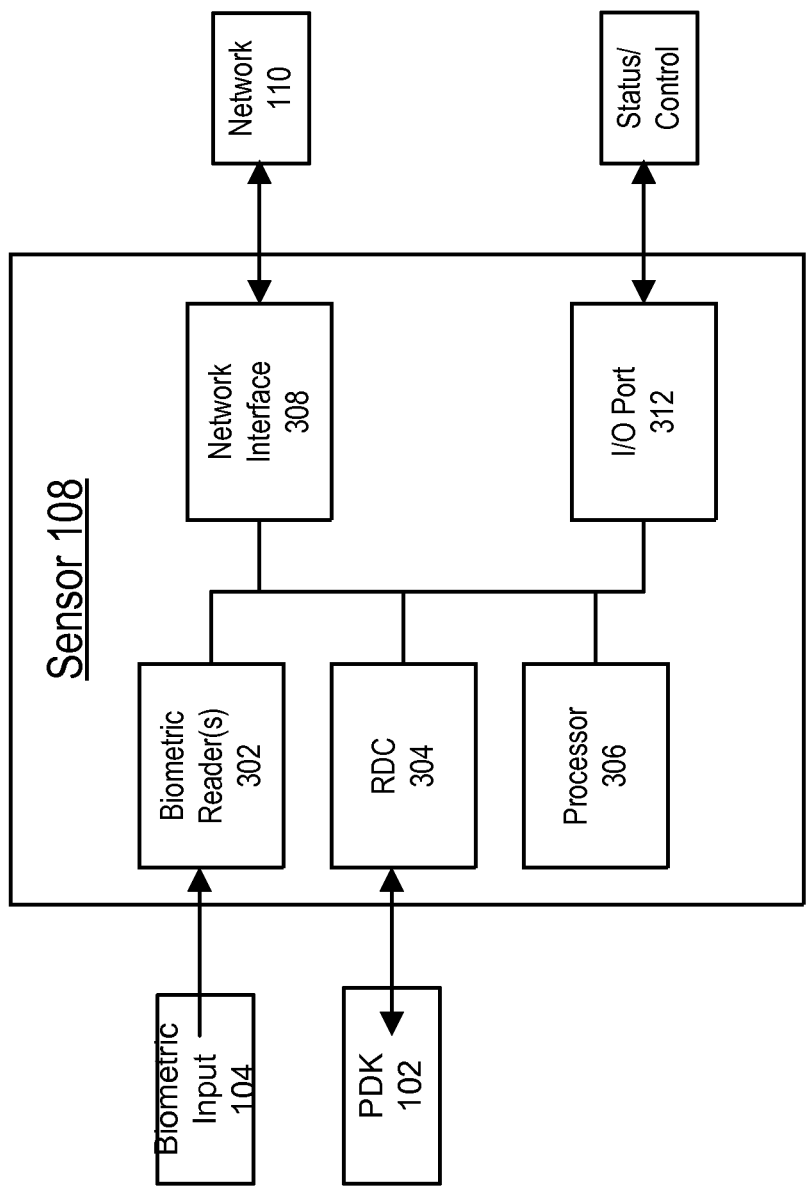
FIG. 3 is a block diagram illustrating one embodiment of a sensor.

Turning now to FIG. 3, an example embodiment of a sensor 108 is illustrated. The embodiment includes one or more biometric readers 302, a receiver-decoder circuit (RDC) 304, a processor 306, a network interface 308 and an I/O port 312. In alternative embodiments, different or additional modules can be included in the sensor 108.

The RDC 304 provides the wireless interface to the PDK 102. Generally, the RDC 304 wirelessly receives data from the PDK 102 in an encrypted format and decodes the encrypted data for processing by the processor 306. An example embodiment of an RDC is described in U.S. patent application Ser. No. 11/292,330 entitled "Personal Digital Key And Receiver/Decoder Circuit System And Method," the entire contents of which are incorporated herein by reference. Encrypting data transmitted between the PDK 102 and sensor 108 minimizes the possibility of eavesdropping or other fraudulent activity. In one embodiment, the RDC 304 is also configured to transmit and receive certain types of information in an unencrypted, or public, format.

The biometric reader 302 receives and processes the biometric input 104 from an individual. In one embodiment, the biometric reader 302 is a fingerprint scanner. Other embodiments of biometric readers 302 include retinal scanners, iris scanners, facial scanner, palm scanners, DNA/RNA analyzers, signature analyzers, cameras, microphones, and voice analyzers. Furthermore, the sensor 108 can include multiple biometric readers 302 of different types.

The network interface 308 can be a wired or wireless communication link between the sensor 108 and network 110. For example, in one type of authentication, information is received from the PDK 102 at the RDC 304, processed by the processor 306, and transmitted to external authentication databases through the network interface 308. The network interface 308 can also receive data sent through the network 110 for local processing by the sensor 108. In one embodiment, the network interface 308 provides a connection to a remote system administrator to configure the sensor 108 according to various control settings.

The I/O port 312 provides a general input and output interface to the sensor 108. The I/O port 312 may be coupled to any variety of input devices to receive inputs such as a numerical or alphabetic input from a keypad, control settings, menu selections, confirmations, and so on. Outputs can include, for example, status LEDs, an LCD, or other display that provides instructions, menus or control options to a user.

Figure 4:
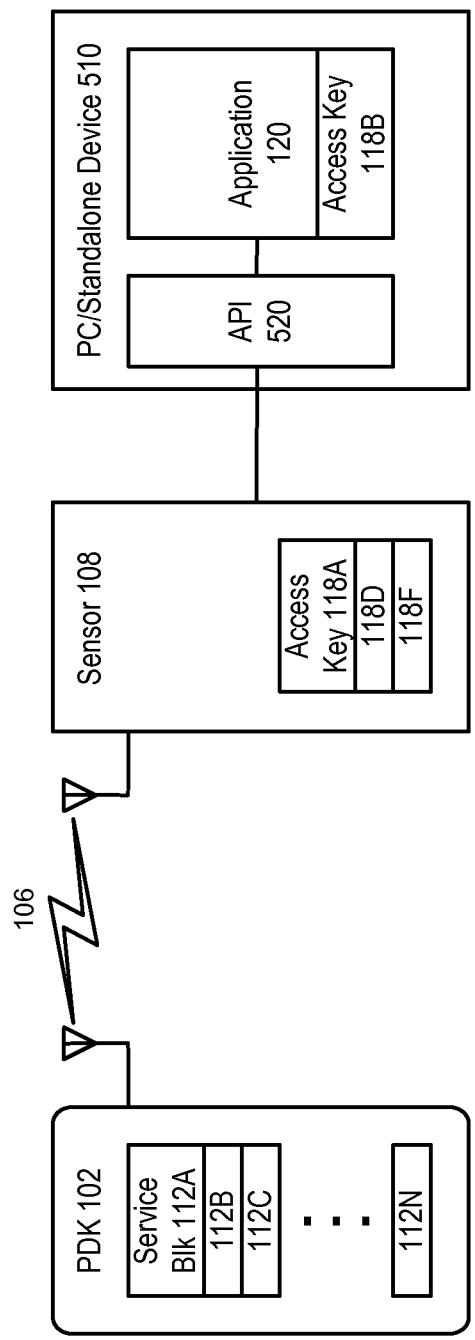
FIGS. 4-6 are block diagrams illustrating further embodiments of systems according to the invention.
Figure 5:
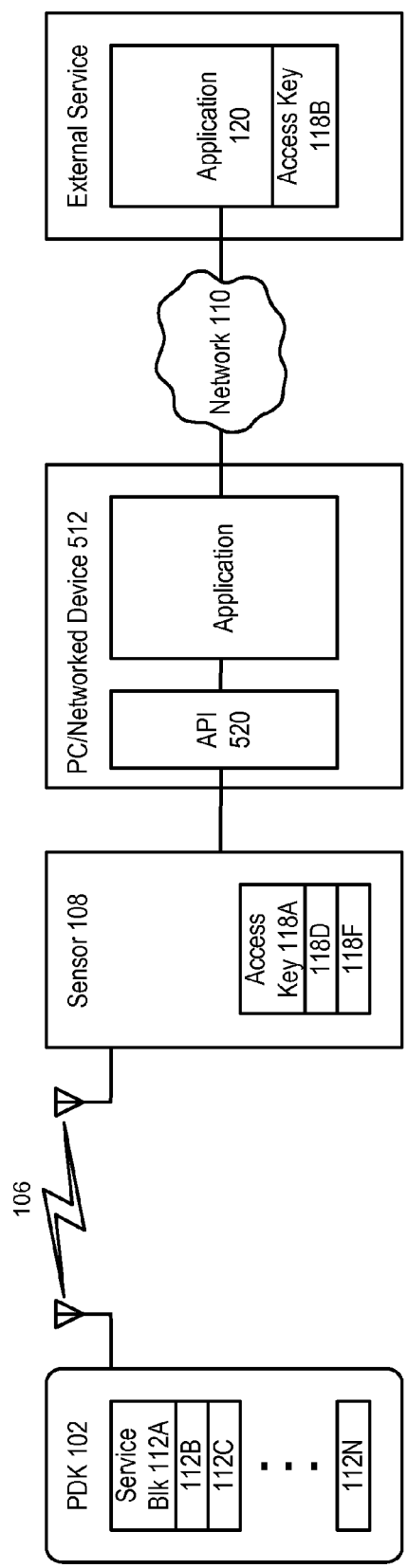
Figure 6:
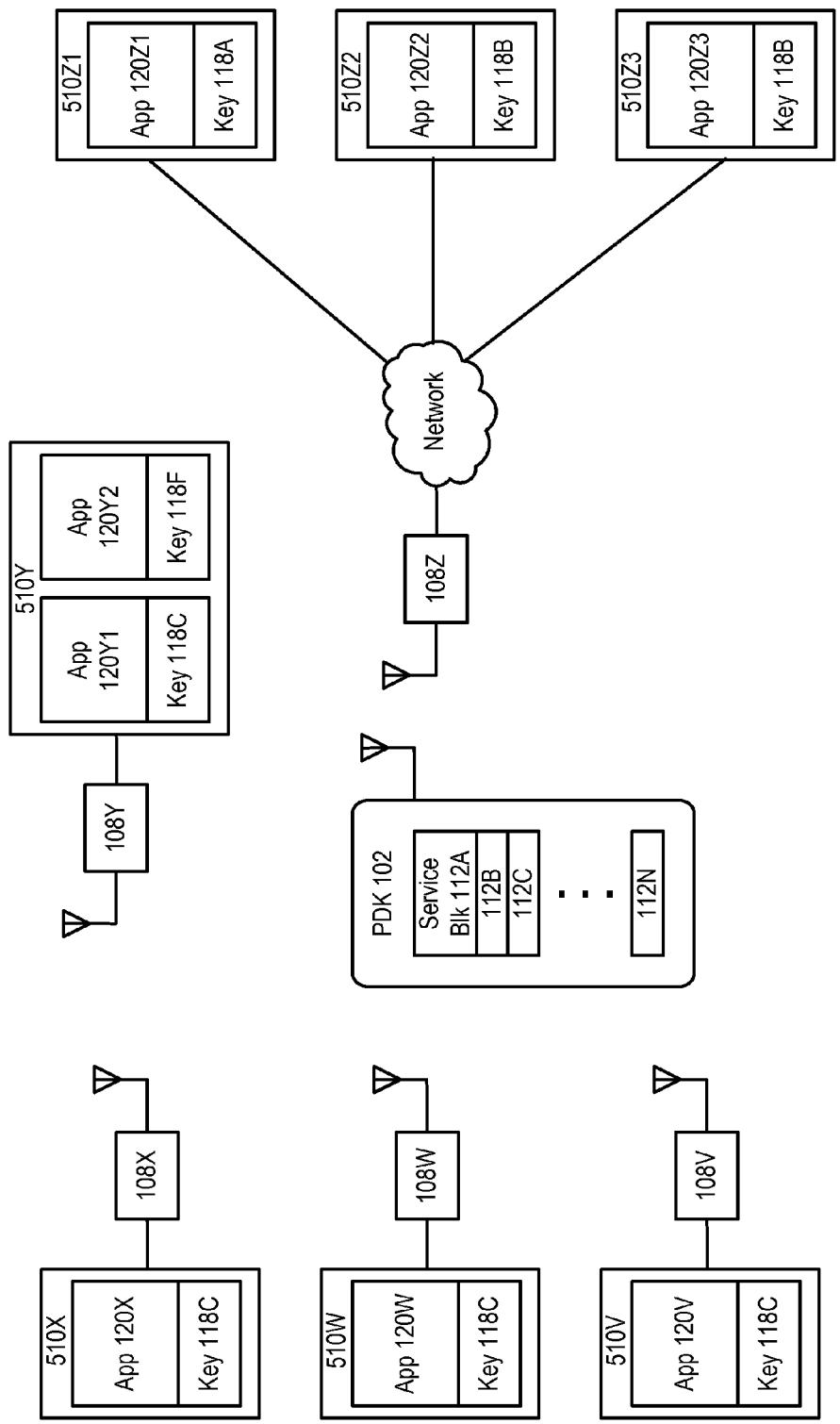

FIGS. 4-6 are high level block diagrams illustrating additional examples of applications accessing service blocks. FIGS. 4 and 5 illustrate that the application 120 need not be located at any particular location on the network. Rather, the service block 112 is accessed from any application 120 that can attach (in a network sense) to the sensor 108.

In FIG. 4, the sensor 108 attaches to the PDK 102 within its microcell, using service block access key 118(A) and service block 112(A). A personal computer or other standalone device 510 is attached to the sensor 108, either directly or via a network. In this example, the device 510 communicates with the sensor via a standardized API 520. An application 120 executes on the device 510 and has access to the service block access key 118(B). It uses this key to gain access to the corresponding service block 112(B). This is an example of a local application 120.

FIG. 5 illustrates a remote application. In this example, the sensor 108 attaches to the PDK 102 in the same manner as FIG. 4, using service block access key 118A and service block 112A. However, application 120 is not executing on a local device. Rather, it executes remotely. Here, it is shown as an external service 120. However, service 120 can still gain access to service block 112B by use of service block access key 118B, although it does so via network 110 and intermediate device 512. Although the sensor 108 is the device that attaches to the PDK 102, a local or remote application 120 with the right credentials may store or retrieve information in a service block 112 in the PDK 102.

The PDK itself can also be configured to prevent the same source from repeating invalid access attempts to the PDK's service blocks. The PDK may monitor access to the service blocks. When an attached service makes multiple unsuccessful attempts to unlock a service block, the PDK tracks this and eventually ignores the requests from that service for a period of time. Alternately, the PDK may disconnect from the network or take other actions.

An example of a local application (FIG. 4) is an auto login/logoff of a personal computer. When a PDK 102 is within the proximity of the personal computer 510, the PDK 102 is detected and the sensor 108 attaches to the PDK 102 (using service block 112A). The login/logoff application 120 then sends the service block access key 118B along with a request for the contents of the service block 112B to the PDK 102 via the sensor 108. For example, a standard may specify that particular service block 112B contains username and password. These are returned to the application 120, allowing automatic login to the personal computer 510.

An example of a remote application (FIG. 5) is a credit card transaction. The sensor 108 in this case could be a credit card terminal. When the PDK 102 is brought in close proximity, the credit card terminal 108 attaches to the PDK 102 (using service block 112A). The terminal 108 then sends the PDK ID 212 to the credit card issuer (the external service) for identification. The credit card issuer may then send a service block access key 118B back to the sensor 108, where it is passed on to the PDK 102 to unlock a specific service block 112B. The contents of the service block 112B could then be sent back to the credit card issuer where further decryption could occur and the credit card holder could be verified. Once verified, the credit card terminal displays that the transaction is approved.

These two examples illustrate basic concepts of the capabilities of the service blocks and how an application (service) may use them. Since service blocks preferably are both readable and writable, services may use them as they see fit (i.e.

debit, username/password, credit card information, etc.). In some sense, the service block acts as a secure local memory on the PDK.

FIGS. 4 and 5 illustrate a basic case where a single application accesses a single service block on a single PDK via a single sensor. The invention is not limited to this case. FIG. 6 illustrates a case with multiple applications, sensors, and service blocks. This illustrates the sharing of service blocks. As shown, service blocks may be limited to a single service or source or may be shared across multiple services and sources. A service block 112 is a protected memory element which allows an application 120 with the right credentials to access it. In this example, applications 120W, 120X and 120Y1 can each access service block 112C since each application has access to service block access key 118C. Similarly, applications 120V, 120Z2 and 120Z3 can each access service block 112B. Although not shown in FIG. 6, it is also possible for an application to access more than one service block. FIG. 6 also shows a situation where applications 120Z1-3 running on different devices 510Z1-3 all access the PDK 102 through the same sensor 108Z. Each sensor 108 covers a certain proximity zone (i.e., microcell). The presence of the PDK 102 within a microcell indicates proximity of the PDK to that particular sensor.

Also shown is a device 510Y with two applications 120Y1 and 120Y2, each of which accesses a different service block. In some cases, the first application 120Y1 is enabled from a first service block 112C, thus allowing a second application 120Y2 to operate using a second service block 112F (although the two applications need not be on the same device 510). For example, the first application 120Y1 might be the auto login/logoff, where a user logs in to a personal computer via a service block 112C that provides a username and password. Now that the user is logged in, the user wishes to attach to his credit card company. The user types in the web address of the credit card provider, where the credit card provider requests the user's credentials. First, the user may have to provide some live biometric information. Application 120Y2 compares this against a biometric stored in a second service block 112F on the PDK. After the sensor 108Y verifies the correct biometrics, the sensor indicates to the PDK that external services may now access their service blocks. The credit card provider 120Z1 then sends its service block access key 118A to the PDK where this third service block 112A is retrieved and sent back to the credit card issuer. The credit card issuer then verifies the data and authorizes the user's transaction.

Furthermore, although the above scenarios focus mostly on service blocks in the PDK, applications may also use the basic authentication function that allows the PDK and sensor to verify each other. In this scenario, once the sensor and PDK finish their verification the application is signaled. The application may then use this information as an assurance that the PDK is a legitimate device (but not necessarily that the holder of the device is legitimate).

In certain cases, access to a service block 112 may allow the application 120 to access various input/outputs on the PDK. For example, the PDK may have several inputs and/or outputs, as well as a serial (or other) interface. The inputs may be either transition triggered or level triggered. An example of a transition triggered event might be a button press, where level triggered might be turning a switch on. Multiple outputs may also exist where they may also be pulsed or level outputs. Finally an interface may allow attachment of an external device, which may then send data through the PDK to the application. In many cases, the inputs and outputs may be simple push button switches and LEDs used to allow a user to interact with an application.

Since the number of applications is limitless, different applications may use the inputs and outputs for different functionality. For example, a user walking into a casino may require attention from a service representative and if the casino has enabled button 1 for this functionality, when the user depresses button 1, an attendant is alerted with information related to the user and the location of the user. In a different application, an actual button may not exist, but it may be tied to an output of another device indicating when a piece of equipment was in use. Whenever the device was in use, the PDK transmits the input 1 active alert back to the backend application. The backend application may then be using this information to determine when the equipment must be recalibrated based on its usage.

This is also true for outputs and any interfaces. Outputs may be used to turn on a light or sound an audible tone used to locate an asset in a building. For example, there may be 20 pieces of equipment in a room which all show up using a location tracking program, but the user would then have to sift through each piece of equipment until the right one is located. Using an output as described above, a light could be lit and the equipment could be immediately located within the room. The interface allows another attached application to the PDK to send information to an end application attached to the sensor. In this case the sensor provides a medium to push data to an external source.

Figure 7:
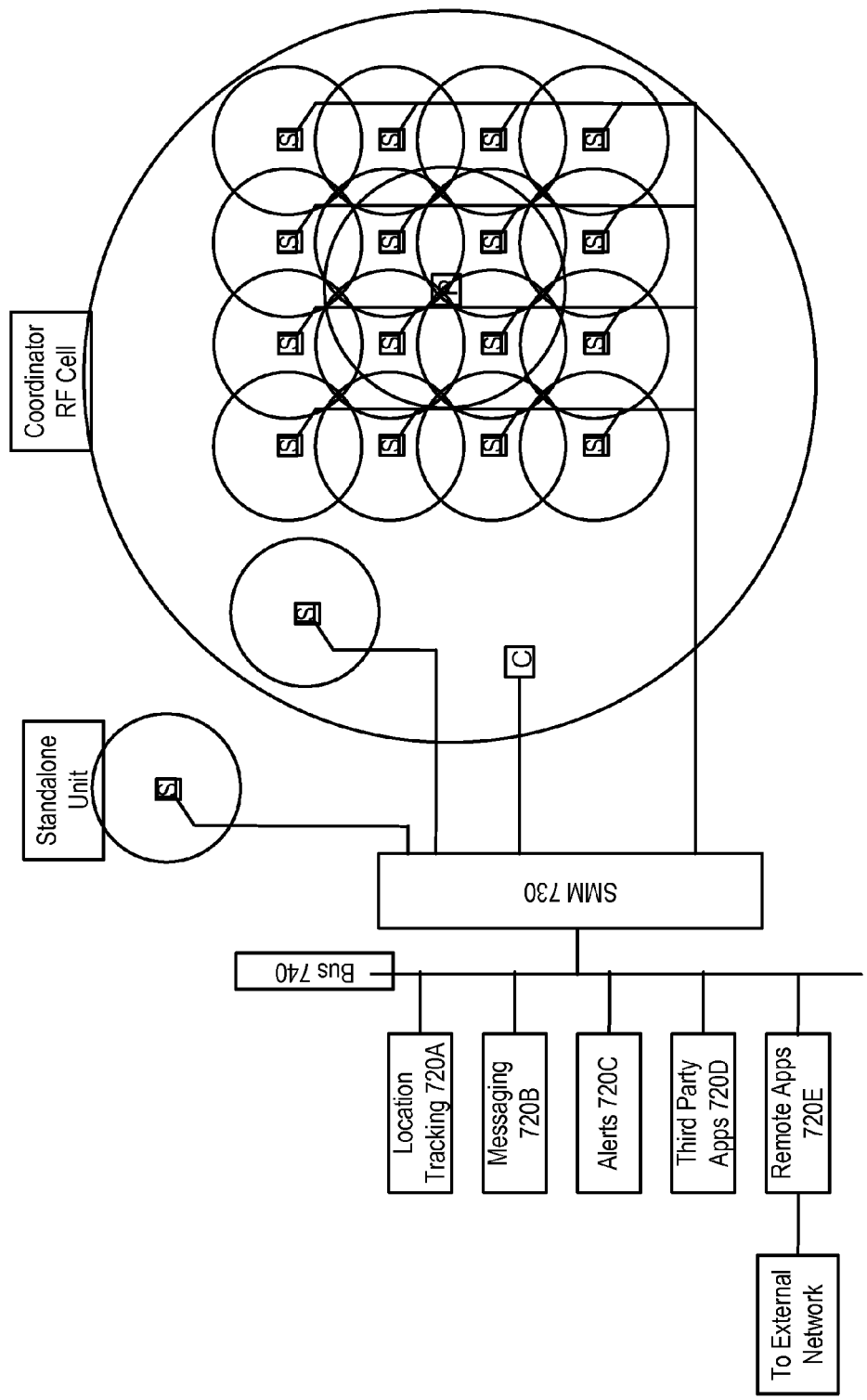
FIG. 7 is a block diagram illustrating one embodiment of a system with networked sensors.

FIG. 7 is a high level block diagram illustrating one embodiment of a system with networked sensors. In this example, multiple sensors (marked "S") are attached to a Sensor Management Module (SMM) 730. The SMM 730 provides data routing for the sensors (e.g., to and from applications 720A-E). In this example, the SMM 730 also receives data from the sensors and processes this data to provide location tracking of PDKs (marked "P") that are within the sensor field. In this implementation, the system also includes an application layer message bus 740, over which the SMM 730 and applications 720 can exchange messages. This allows multiple applications 720 to simultaneously communicate with PDKs and make use of the location tracking of the PDKs. The application layer message bus 740 may also be extended to other applications via a remote application interface.

In FIG. 7, each sensor's microcell (i.e., proximity zone) is denoted by a circle around the sensor. Similarly, the PDK's range is shown by the heavy larger circle. In the example shown, the PDK is in range of four different sensor zones and any of the four sensors may establish communications to the PDK. Using a network topology as shown, the SMM may instruct a specific sensor to attach to the PDK. Once established, the communication link will allow the PDK to communicate with various applications 720, in this example via the SMM 730 and bus 740. Applications 720 will be able to access service blocks on the PDK through the use of service block access keys, as described above.

In addition, in this example, the sensors are at known locations, preferably at fixed locations. For example, sensors may be distributed throughout a building or other structure or site (including outdoors). The sensors interact with the PDK in a manner that allows the sensors to gather position data about the PDK. This position data is sent by the sensors to the SMM 730, which processes the data to determine the PDK's position and to provide location tracking of the PDK over time. The position and/or location tracking information can then be made available to applications 720 via bus 740, in addition to allowing the applications 720 to communicate with the PDK.

Location tracking of the PDK by the sensor network can be achieved in different ways, one of which will be described below. The example in FIG. 7 uses a coordination module (marked "C") or simply coordinator, although this is not required in other implementations. The large dashed circle shows the coordinator's cell. In this example, the sensors preferably contain two transceivers, one to communicate with the coordinator on what will be referred to as the control channel and another to communicate with the PDK on what will be referred to as the traffic channel.

Figure 8:
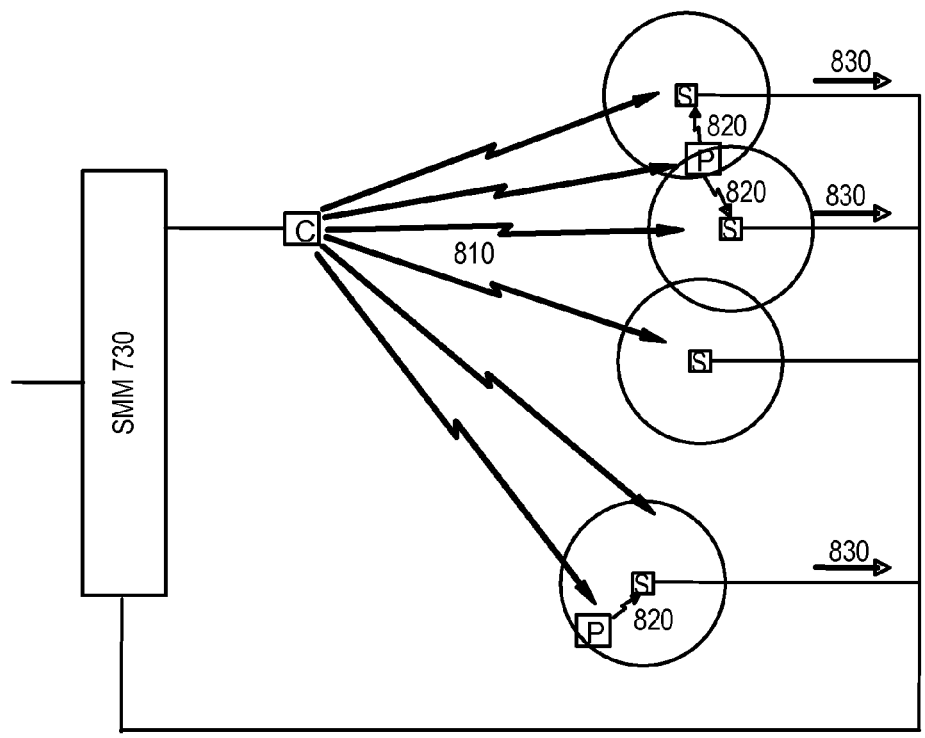
FIGS. 8-9 are block diagrams illustrating operation of the system in FIG. 7.

FIG. 8 illustrates operation of the system in FIG. 7. The coordinator C broadcasts 810 a periodic beacon on a control channel. The sensors and PDKs synchronize to this periodic beacon. On the control channel, when a sensor is not receiving the broadcasted beacon, it is timesharing between listening for a PDK ALOHA response and possibly sending a command to a specific PDK. The PDK, after detecting the beacon, remains on the control channel and continues to periodically wake up, receive the beacon, and realign its timing. By using system related information found in the beacon and its own serial number, the PDK calculates the wakeup time to synchronize to the beacon and broadcast 820 an ALOHA response. As shown, the PDK's broadcasted ALOHA response may overlap several sensors causing multiple sensors to receive the information simultaneously. Each sensor that receives an ALOHA response from a PDK performs a store and forward 830 of the responses to the SMM 730 on a periodic basis.

The coordinator and sensors communicate to the SMM 730 via a backend network. This communications method used to attach each device to the SMM may be wired or wireless provided it has the bandwidth required to transport the information between the devices. When a PDK ALOHA response is detected by a sensor, the sensor collects information such as the PDK ID, receiver signal strength indication, and timestamp. After receiving this information from the sensors, the SMM independently applies the new information for each PDK from the sensors, to the previous history of that PDK and through location deterministic algorithms computes the most likely sensor microcell in which the PDK is located. There are multiple known algorithms for doing so. In one approach, location (proximity) is determined based on prior location history, time at the current location, RF signal strength and geographic contours. The SMM may also store the raw data for further alternate processing methods or for diagnostic purposes.

The SMM 730 can broadcast this information on the application layer messaging bus 740 for applications 720 to use. For example, one application 720A might be a location tracking application with a graphical user interface that shows the current position or trail of the PDK. The SMM 730 (or applications 720) may also store the location information and make it available on an on-demand basis.

In this particular example, access is allocated using a time division multiple access (TMDA) system, where an RF logical channel is distributed over time and each device has a specific period known as a timeslot in which they are allowed to respond. Each timeslot has a preamble and timeslot synchronization character followed by a packet, and lastly a guard period. The content of each packet is dependent on the source device, channel type (control or traffic), and timeslot location.

For example, the coordinator broadcasts the beacon on a period basis. All sensors and PDKs receive the beacon. Each PDK then broadcasts its ALOHA response at a specific timeslot allocated for that purpose. In addition to the handshake messages that occur on the control channel, the beacon and ALOHA response may also carry auxiliary data. This data may be in the form of an alarm indication, command/status, or user/application data, for example. It could be provided by an end application, SMM network command, external device interface (such as a terminal interface), or via an internal alarm functions such as low battery, input signal change, or setting an output signal polarity.

After an ALOHA response is broadcast from a PDK, the PDK listens for a command from nearby sensors. Based on the type of PDK and time it is present in one geographical location, one or more nearby sensors that detected the ALOHA response, may also send additional paging or auxiliary data in the sensor command response timeslot for a specific PDK.

Other timeslots can be allocated to traffic channels and/or to other messages over the control channel. Various TDMA approaches can be used to allocate the wireless communications channel. Non-TDMA approaches can also be used.

The sensor network system of FIG. 7 provides a closed loop system. With the SMM 730 being the central hub, broadcasting auxiliary data through the coordinator (and sometimes sensor devices) and collecting PDK auxiliary data through the sensors, it is possible to determine if in an asymmetrical system a command was successfully completed.

Figure 9:
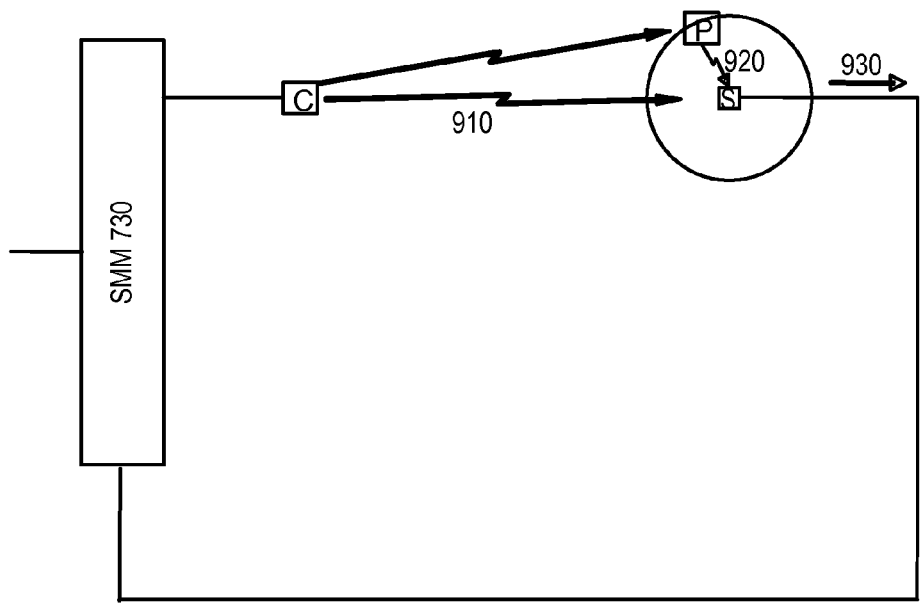

FIG. 9 illustrates an example of how the closed loop system works. In step 910, the SMM 730 (via the coordinator) broadcasts a beacon that also contains auxiliary information. This auxiliary information contains a command from an application 720 to be executed by the PDK. Assume that, for this particular command, the PDK is expected to acknowledge execution of the command. After the PDK executes the command, the PDK sends 920 the acknowledge message as auxiliary data in one of the PDK's ALOHA responses. The sensor receives the ALOHA response and passes 930 the information back to the SMM 730. The SMM 730 has now verified that the command was successfully executed. Such commands could be as simple as set an output to turn on a light or generate an audible sound. It is also possible that an application 720 attached to the SMM 730 may request to pass data to the specific PDK where that data may then be passed to an external terminal application where the system acts only as a transport mechanism. In this mode, the applications attached at each end would be responsible for verifying and acknowledging the data was sent and received successfully.

Figure 10:
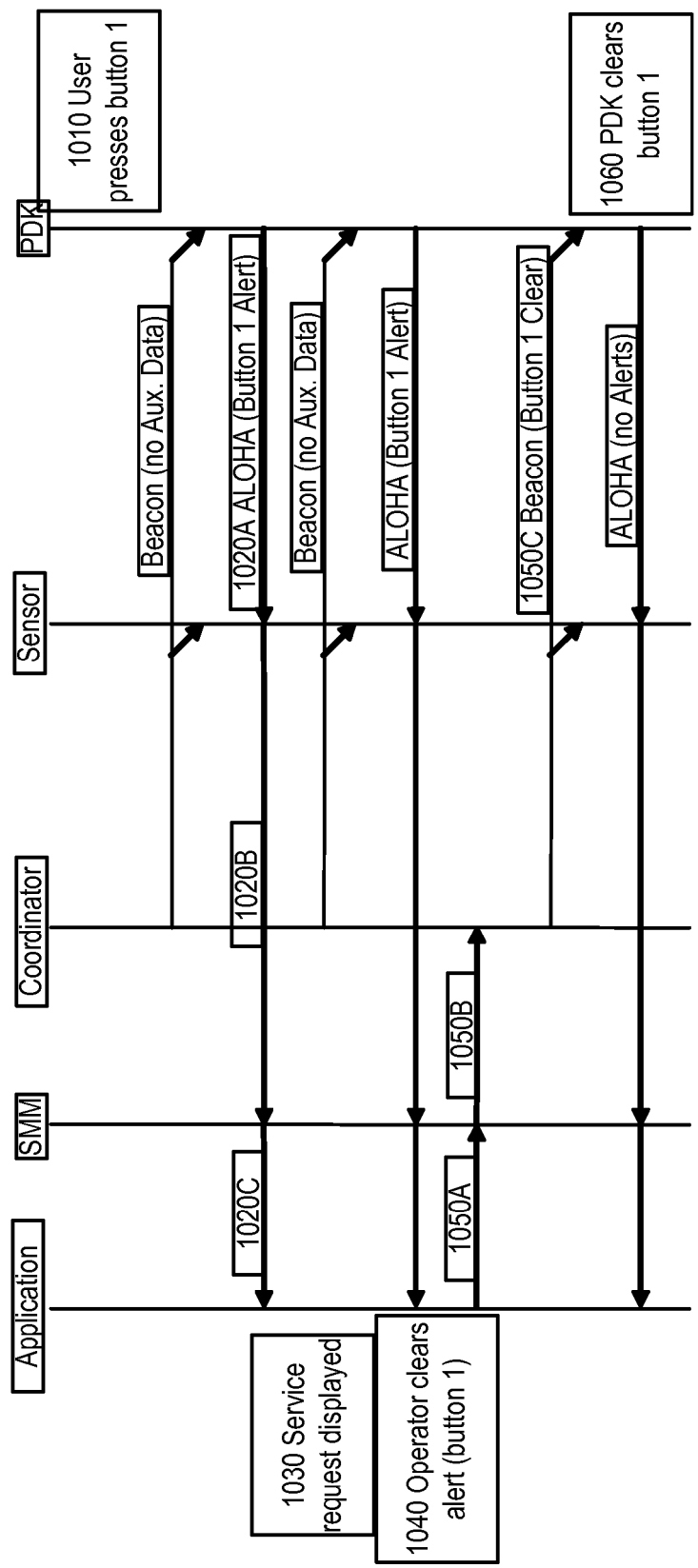
FIG. 10 is a diagram illustrating operation of the system in FIG. 7.

A second example is shown in FIG. 10, where the PDK initiates an alert. The coordinator periodically transmits a beacon and the PDK periodically returns an ALOHA response. In the example, a user carrying a PDK is located within a service oriented business, such as a department store, casino, restaurant, etc. The user desires to talk with a service representative from the organization and depresses 1010 the service button on their PDK (button 1). The next time the PDK wakes up to send an ALOHA response, the PDK attaches the button 1 alert to the ALOHA messages and broadcasts 1020A it. A local sensor receives the location response containing the button 1 alert and eventually sends 1020B the received ALOHA responses back to the SMM. The SMM may reformat the data and passes 1020C the indication back to the application. The application then indicates 1030 a button 1 request from the particular PDK serial number (and other related user information) on the application console. The PDK continues to send back the button 1 alert until cleared or a timeout period occurs. This allows devices that have inadequate coverage (e.g., on the edge of a cell boundary) to continue to send the alert until detected.

Eventually the console operator becomes aware of the service request and dispatches a representative to the user and clears 1040 the button 1 alert on the console. The clear button 1 alert is then sent 1050A-B to the coordinator where it is queued to go out 1050C on the proper beacon when the PDK will be awake. Once the PDK wakes up and receives 1050C its next beacon, the PDK clears out 1060 the button 1 alert indicator and returns to a basic ALOHA state with no auxiliary data pending.

The example shown may have also had a visible indicator in the PDK where the visible indicator may have become lit when the button was depressed. Once the button 1 alert was cleared the indicator would be unlit.

In this example, neither the application nor SMM verified the PDK actually received the clear button 1 alert. In one approach, each auxiliary message (page, alert, etc.) sent by a device contains a sequence number. If a device continues to send the information after it is acknowledged or cleared, the device is aware of the condition because of the sequence number. Any time a new auxiliary message is sent, the sequence number is incremented to alleviate the confusion as to how new or old any message is.

For some systems, redundancy is important. Redundancy can be implemented in the example system of FIG. 7 in a number of ways. For example, it is possible to provide multiple coordinators where these coordinators can be used to extend a coverage area or as a redundant backup. In one approach, each coordinator broadcasts its beacon on the same RF channel with a slight timing offset from the other coordinators. This creates a simulcast system where if one coordinator fails, the second coordinator can still resume system operation. This may also counter the issues of multipath by providing spatial diversity with the coordinators. Another redundancy measure is that information can be sent to PDK via the sensors, in addition to or in place of the coordinator. Another example of redundancy is that multiple sensor may receive messages from the PDK so there may be multiple paths back to the SMM via different sensors.

Figure 11:
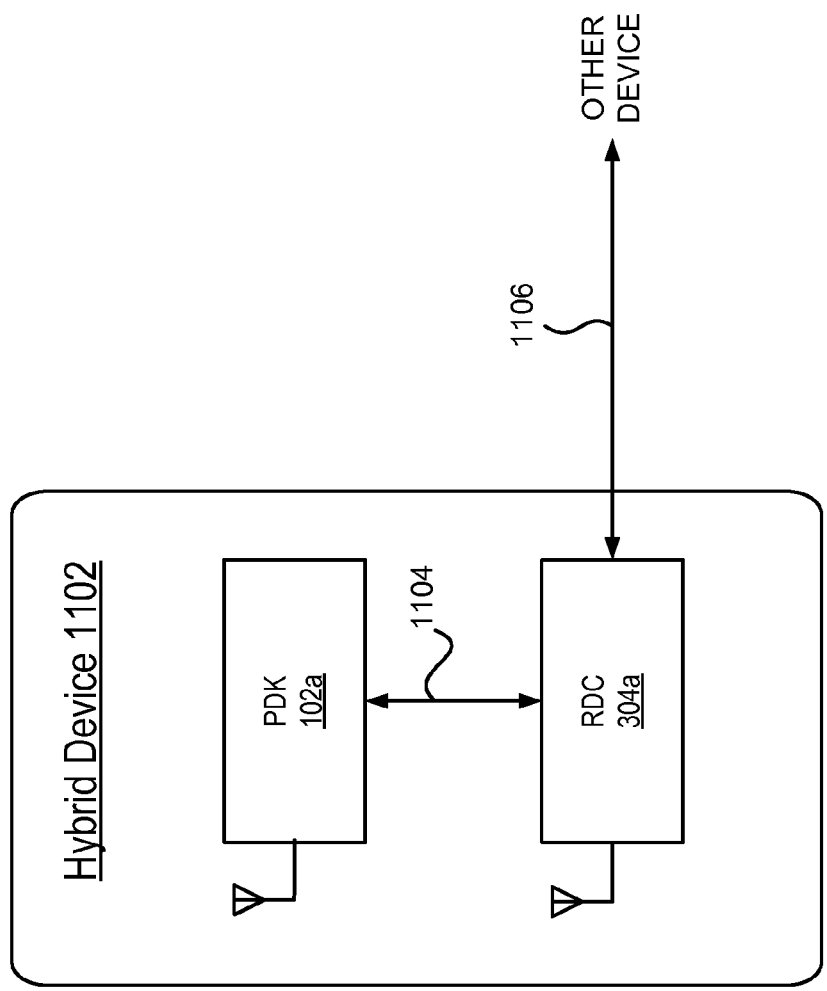
FIG. 11 is a block diagram of one embodiment of a hybrid device in accordance with the present invention.

Referring now to FIG. 11, one embodiment of a hybrid device 1102 in accordance with the present invention will be described. The hybrid device 1102 comprises a PDK 102*a* and an RDC 304*a*. Depending on the embodiment, the hybrid device 1102 utilizes the PDK functionality, the RDC functionality or both the PDK functionality and the RDC functionality. Those skilled in the art will recognize that in other embodiments, the hybrid device 1102 has multiple instances of PDK functionality or multiple instances of the RDC functionality or multiple instances of both. As illustrated in FIG. 11, the PDK 102*a* is coupled by signal line 1104 to the RDC 304*a*. This direct coupling allows the PDK 102*a* and the RDC 204*a* to communicate control signals and data for various applications will be described below. The signal line 1104 is also used to provide power to the PDK 102*a* via the RDC 304*a* in configurations where the RDC 204*a* is coupled to a power source via signal line 1106. In this embodiment, the RDC 304*a* is also coupled to signal line 1106 for communication with other devices (not shown). The signal line 1106 can be used to send and receive control signals and data as well as to receive power. Thus, in certain embodiments, the hybrid device 1102 need not have its own independent power source. Moreover, in other embodiments not shown, signal line 1106 is coupled directly to the PDK 102*a* to provide power.

In one embodiment, the PDK 102*a* is similar to the PDK 102 described above with reference to FIG. 2 and includes the same functionality as described above. Those skilled in the art will recognize that in other embodiments, the PDK 102*a* includes less functionality than that described above with reference to FIG. 2. In a minimal embodiment, the PDK 102*a* includes an antenna and a transceiver for communicating with a RDC (not shown) and a controller and memory for storing information particular to a user. In yet other embodiments, the PDK 102*a* includes functionality beyond that described above with reference to FIG. 2. The PDK 102*a* implements the PDK functionality as will be described below with reference to FIGS. 11-16 using a processor and memory of the PDK 102*a*.

For simplicity and ease of understanding, the hybrid device 1102 is shown as including an RDC 304*a*. In one embodiment, the RDC 304*a* is similar to that described above with reference to FIG. 3 above. In another embodiment, the RDC 304*a* represents and includes the functionality described above as being provided by the sensor 108. Those skilled in the art will recognize that the RDC 304*a* may have more or less functionality that described above with reference to FIG. 3 above. The RDC 304*a* implements RDC functionality as will be described below with reference to FIGS. 11-16 using a processor and memory of the RDC 304*a*. The RDC 304*a* is coupled to an antenna for communication with other PDKs 102 and coupled to signal line 1106 to send and receive data and control signals from other devices (not shown). In certain embodiments, signal line 1106 also provides power to the RDC 304*a*.

Figure 12:
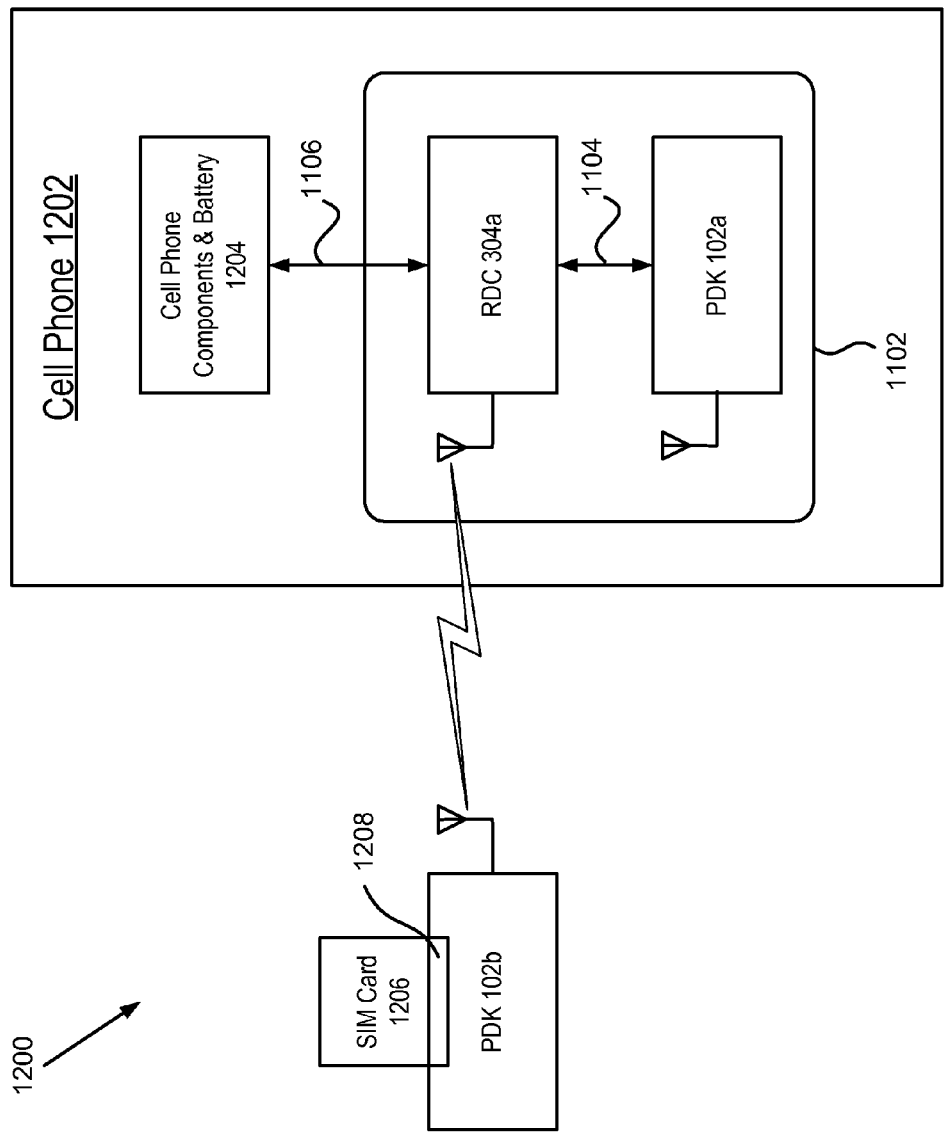
FIG. 12 is a block diagram of one embodiment of a system in which the hybrid device is part of a cell phone in accordance with the present invention.

Referring now to FIG. 12, one embodiment a system 1200 of the present invention in which the hybrid device 1102 is part of a cell phone 1202 will be described. The system 1200 comprises a PDK 102*b* and the cell phone 1202. The cell phone 1202 further comprises cell phone components and a battery 1204 and the hybrid device 1102. As described above with reference to FIG. 11, the hybrid device 1102 includes PDK 102*a* and RDC 304*a* coupled for communication with each other via signal line 1104. In this embodiment, the cell phone components and a battery 2004 are coupled to the RDC 304*a* by signal line 1106. This allows the RDC 304*a* to use the communication capabilities of the cell phone 1202 including the voice and data channels provided by conventional cell phone to communicate with other networks and devices (not shown). The RDC 304*a* and the PDK 102*a* are adapted to communicate wirelessly with other devices, such as the PDK 102*b*. While FIG. 12 shows the hybrid device 1102 as including both the RDC 304*a* and the PDK 102*a*, in another embodiment the hybrid device 1102 includes only the RDC 304*a*.

In one embodiment, the cell phone 1202 including the hybrid device 1102 collectively forms a secure cell phone or a generic access point. In such an embodiment, the hybrid device 1102 has a form factor similar to that of a conventional SIM card for cell phones. This is particularly advantageous because the hybrid device 1102 can be used with a variety of existing cell phones without any modification and the hybrid device 1102 is merely inserted in place of a conventional SIM card to provide this functionality. The conventional SIM card is replaced with the hybrid device 1102 that provided the RDC functionality. In other words, the hybrid device 1102 provides authorization control as well as a storage area for storing information specific to a user. The SIM content (Cell phone account, contact information, and credit card information) that is normally stored in the cell phone 1202 is instead stored in the PDK 102*b* carried by the user. In one embodiment, the PDK 102*b* stores the original SIM content in its local memory. For example, the PDK 102*b* defines a SIM slot 1208 to receive the original SIM card 1206, communicatively couples to the SIM card 1206 and copies the information from the SIM card 1206, effectively giving the original SIM card 1206 a wireless extension.

Such a configuration is particularly advantageous for a number of reasons. First, the cell phone 1202 is rendered useless (except 911) if the PDK 102*b* is out of range of the RDC 304*a* of the hybrid device 1102. Second, the local phone content such as calendar, contacts, etc. is protected because it resides on the PDK 102*b*, and is secure and not accessible by the cell phone 1202, its hybrid device 1102 or its RDC 304*a* without the PDK 102*b*. Third, the RDC function provided by the RDC 304*a* of the hybrid device 1102 in the cell phone 1202 becomes a generic access point and allows any PDK 102, not just the PDK 102*b*, to access it. Thus, any user that has an account with a specific service provider may "bond" or "link" their PDK 102 to the cell phone 1202, allowing their account to be charged for any services rendered. Both the bonding process and service access may be performed via the keypad, voice activated, or via bio-functions of the cell phone 1202. Fourth, any PDK 102 may store and provide contract based account information (such as a cell phone account), or may provide credit information (such as a credit or debit card) that is billed for the service. This allows any person that carries a PDK 102 with credit card information store thereon to use their credit card to gain wireless voice and data services without signing a long term contract. Fifth, since the content is carried on the PDK 102, any type of cell phone may be used. The PDK 102 provides active updates to its internal contents allowing for "last call received" or "last number dialed" to be saved. By bonding the PDK 102 to another phone and hitting redial, the last number that was dialed from any other phone associated with the PDK, is now redialed. There is no need to transfer information from phone to phone or to have back up contact information stored on a personal computer. In an alternate embodiment, the contents (including last number dialed) are stored at the service provider (or in a user defined path—i.e. personal website, etc.) and become available on the cell phone 1202 when the PDK 102 "bonds" to the phone 1202. The referenced account is obtained and the data is transferred to that phone in volatile memory using the network of the service provider to which the cell phone 1202 is coupled. Moreover, the PDK "phone" contents may also be synchronized to a personal computer application via an RDC attached to the personal computer. The phone does not have to be present, only the PDK with a correct password or entry method (bio, etc). The above application/configuration makes cell phones generic allowing any subscriber carrying a PDK 102 with either a cell phone account or credit account to acquire any phone and start using it. Since the user's information stays with the user, it is possible the user could span across multiple cell phone providers in different countries and still maintain a single virtual cell phone account.

In another embodiment, the hybrid device 1102 contains a copy of the contents of SIM card 1206 information. In this embodiment, the contents that are stored in hybrid device 1102 may only be accessible if PDK 102*b* is within proximity of the Cell Phone 1202. In this embodiment, SIM card 1206 is not required to be present in the PDK 102*b*.

In a variation to the embodiment described above with reference to FIG. 12, a second embodiment of the system 1200 does not include the PDK 102*b*. Instead the functionality described above with reference to the PDK 102*b* is provided by the PDK 102*a* that is part of the hybrid device 1102. The hybrid device 1102 uses the PDK function provided by PDK 102*a*. The hybrid device 1102 is coupled to the cell phone 1202, in particular the cell phone components and battery 1204, via internal integration or an access port. Such a configuration is particularly advantageous because the PDK function then becomes part of the cell phone 1202 using battery power from the cell phone 1202 and providing the same type of access as described above. Moreover, PDK 102*a* can provide access control passwords etc. for any type of functions enabled by the phone such as but not limited to gaming, personal computer access, e-commerce, etc. Additionally, the PDK enabled phone uses the back channel to perform other validation/update functions via the cellular infrastructure.

In a variation to the embodiment described above with reference to FIG. 12, the hybrid device 1102 includes and uses both the RDC 304*a* and the PDK 102*a*. This adds the hybrid functionality of being capable of performing both simultaneous RDC and PDK functions to the cell phone 1202. The hybrid functionality extends the type of offerings and functionality by allowing the cell phone 1202 to perform the functionality described above as well as additional functionality described below with reference to FIGS. 13-16.

Referring now to FIGS. 13-16, the hybrid functionality provided by the hybrid device 1102 will be described in more detail. The hybrid device 1102 allows for many different configurations and operations of the secure PDK/RDC protocol. The hybrid device 1102 allows mixed operations including: RDC/PDK, RDC/RDC or PDK/PDK combinations. For purposes of explanation below, each device is enabled with either or both RDC and PDK functionality.

Figure 13:
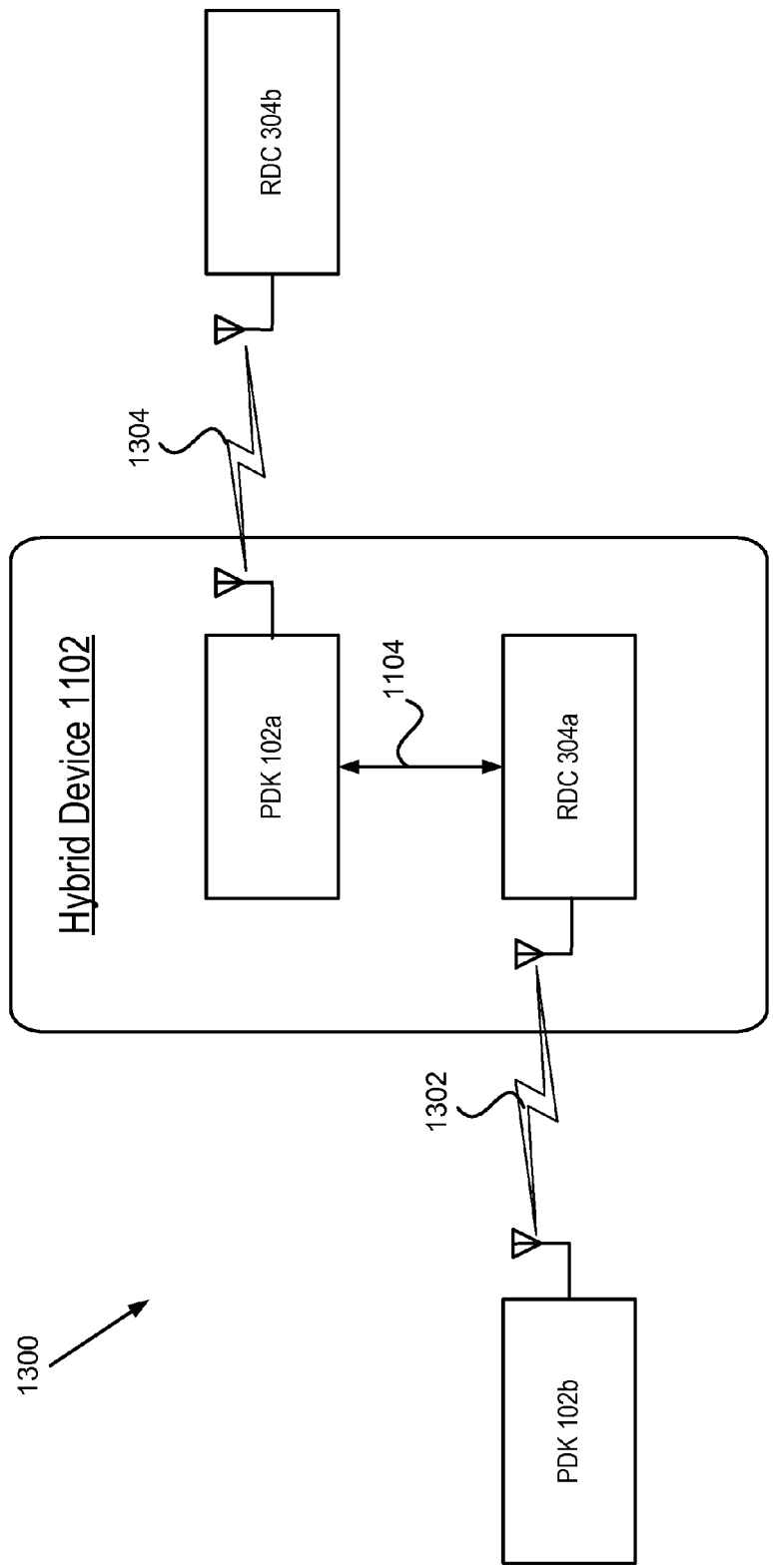
FIG. 13 is a block diagram of one embodiment of a system using the PDK and the RDC functionality of hybrid device in accordance with the present invention.

FIG. 13 is a block diagram of one embodiment of a system 1300 simultaneously using the PDK and the RDC functionality of the hybrid device 1102 in accordance with the present invention. FIG. 13 shows the system 1300 comprising a hybrid device 1102 having a first PDK 102*a* and a first RDC 304*a*, a second PDK 102*b*, and a second RDC 304*b*. In this configuration of the system 1300, the hybrid device 1102 maintains two separate simultaneous links: a first link 1302 between the second PDK 102*b* and the first RDC 304*a* of the hybrid device 1102; and a second link 1304 between the first PDK 102*a* of the hybrid device 1102 and the second RDC 304*b*. In this system 1300, the second PDK 102*b*, possibly carried by a user, enables the first RDC 304*a* of the hybrid device 1102. The hybrid device 1102 in turn with its first PDK 102*a* enables the second RDC 304*b*, for example being associated with a third component such as endpoint RDC function.

In one embodiment, each link 1302, 1304 of the system 1300 provides an independent authorization. In FIG. 13, the hybrid device 1102 provides authorization to the second RDC 304*b*. The hybrid device 1102 carries credentials (credit card, account information, etc.) that are used to enable a service associated with the second RDC 304*b*. For example, a cell phone includes the hybrid device 1102 and the hybrid device 1102 stores credit card information. A user makes a purchase using the cell phone as their credit source. The same user also carries the second PDK 102*b*. The second PDK 102*b* provides authorization to the hybrid device 1102 to enable specific functionality (charging using of the credit card information) provided by the hybrid device 1102. In other words, the second PDK 102*b* is used to enable specific features in the hybrid device 1102. The second PDK 102*b* carries the user's cellular service account information that is used to enable specific cellular services. If the second PDK 102*b* is no longer present, those services are disabled. Each the authorizations, credit card and cell service, is independent of the other.

In another embodiment, the links 1302, 1304 of the system 1300 provide a daisy chained authorization. In FIG. 13, the second PDK 102*b* authorizes the hybrid device 1102 which in turn authorizes the second RDC 304*b*. It is mandatory for the second PDK 102b to have a connection to the hybrid device 1102 before the hybrid device 1102 can initiate a request for authorization from the second RDC device 304b. For example, a parent could give a child conditional charging privileges where the child may only charge if the parent is present. The child carries the hybrid device 1102 (possibly in a cell phone), and chooses to make a purchase in a local video store. That store has a specific account for the child that is linked to his/her PDK 102a of the hybrid device 1102. When the child walks up to the counter to make the purchase, he/she is identified by their personal ID (included on PDK 102a of the hybrid device 1102 and transmitted to the RDC 304b) and their account is opened. Since the parent is in the same vicinity, the hybrid device 1102 communicates with the parents PDK 120b and obtains authorization to charge to the parent's account. If the parent was not present, the child would still be identified, but would not have charging privileges. In an alternate embodiment, the RDC 304a of the hybrid device 1102 allows different PDKs with different credentials to "bond" with it (i.e. Fathers, Mothers, guardian, adult sibling, etc.), any one of which could be used for authorization.

Figure 14:
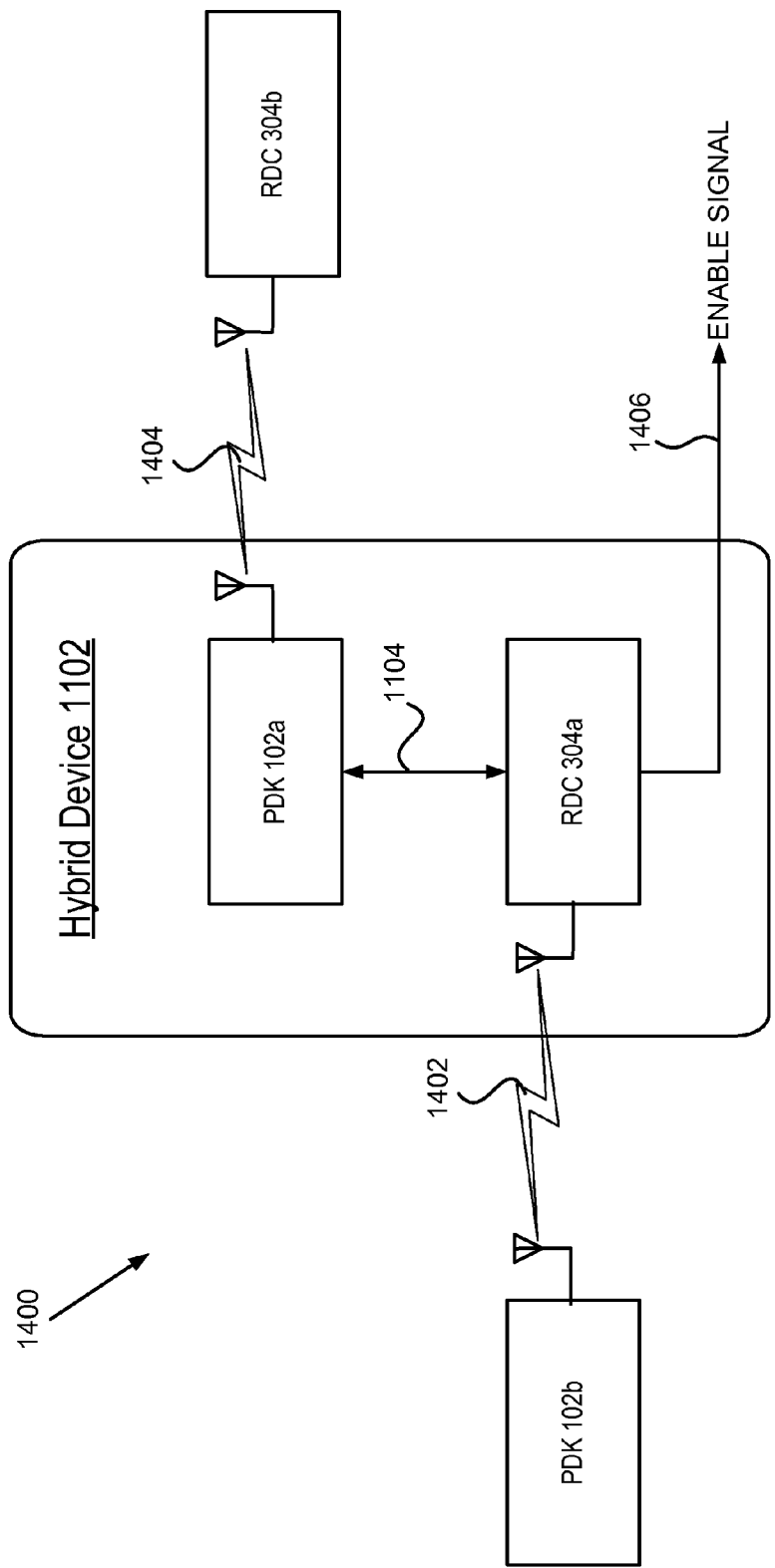
FIG. 14 is a block diagram of one embodiment of a system using the multiple links of hybrid device to generate an authorization signal in accordance with the present invention.

Referring now to FIG. 14, one embodiment of a system 1400 using the multiple links to the hybrid device 1102 to generate an authorization signal in accordance with the present invention will be described. More specifically, only when the hybrid device 1102 has multiple links 1402, 1404 will the hybrid device 1102 generate an authorization or enable signal on signal line 1406. In this embodiment, the hybrid device 1102 has a physical output or connection for providing the authorization signal. Any variety of different types of devices may be coupled to signal line 1406 to receive the authorization or enabling signal. Without receipt of such a signal, the associated devices (not shown) are not operable. As illustrated in FIG. 14, the hybrid device 1102 requires authorization from both the second RDC 304b and the second PDK 102b to enable functionality. As an example, the hybrid device 1102 is coupled to and secures a personal computer (not shown). For the personal computer to operate, it must authenticate with a specific RDC 304b or fixed equipment at a specific physical location. A user carrying a PDK 102b with the correct privileges must also be present to gain access to the computer. If either the RDC 304b or PDK 102b is not present, the hybrid device 1102 does not allow operation of the personal computer. This prevents theft and illegal use of the property.

Figure 15:
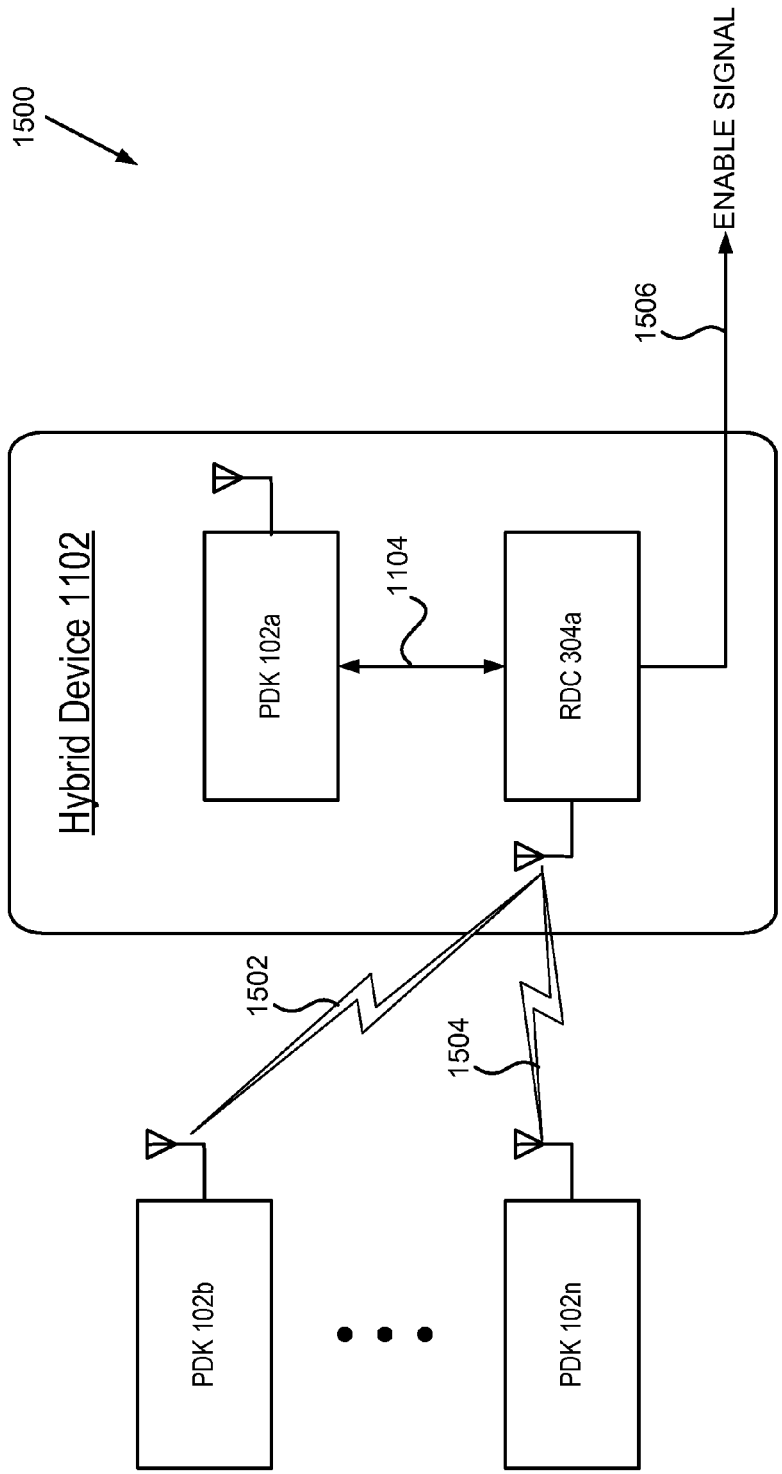
FIG. 15 is a block diagram of one embodiment of a system using the multiple PDK links to the hybrid device to generate an authorization signal in accordance with the present invention.

Referring now to FIG. 15, one embodiment of a system 1500 that uses multiple PDK links 1502, 1504 to the hybrid device 1102 to generate an authorization signal is shown. For the system 1500, only when multiple PDK links 1502, 1504 to the hybrid device 1102 exist, will an authorization enablement signal be generated on signal line 1506. Again, in this embodiment, the hybrid device 1102 has a physical output or connection for providing the authorization signal. The system 1500 comprises the hybrid device 1102 and a plurality of PDKs 102a-102n. Although only two PDKs are shown in FIG. 15, those skilled in the art will recognize that the system 1500 may be configured to include any number of PDKs greater than two. As shown in FIG. 15, the hybrid device 1102 requires authorization (e.g., that a link be established) from multiple PDKs 102b, 102n in order to enable functionality. As an example, the hybrid device 1102 is coupled to control an electronic lock for a safety deposit box. The office manager and the customer each with respective PDKs 102b, 102n need to be present before the hybrid device 1102 generates an enable signal on signal line 1506 to unlock the safety deposit box and allow access to it.

Referring now to FIG. 16, one embodiment of a system 1600 using the hybrid device 1102b for authorization inheritance is shown. One particular advantage of using hybrid devices 102 is that they provide a mechanism for authorization inheritance within the system 1600. Authorization inheritance is when a first device passes selected information to a second device and the second device then "inherits" that information for use. The use of the information can be a one-time use during the presence of the first device, multiple uses with or without the presence of the first device or permanent use. Furthermore, there are multiple types of inheritance including service inheritance, feature inheritance and personality inheritance. Service inheritance is authorization of the second device for any functionality provided by a given service. Feature inheritance is similar to service inheritance but for a limited set of features offered by a given service. Personality inheritance is where the preferences of a user or holder of a first device are shared with a user or holder of a second device.

These inheritance concepts and the operation of the hybrid device 1102b will now be described in the specific context of system 1600 shown in FIG. 16 as including a PDK 102b operating as the first device, the hybrid device 1102b operating as the second device and the RDC 304b operating as the third device. The system 1600 illustrates a hybrid device 1102b with simultaneous PDK and RDC functionality to provide inheritance. In this context, the inheritance promulgates the authorization or features from the first device to the second device and onto the third device. However, those skilled in art will recognize that in another embodiment, the first and second devices both communicate directly with the third device to perform the same function. For example, the PDK 102b and the hybrid device 1102b both directly communicate to the RDC 304b and both provide permissions to allow the RDC 304b to generate an authorization or access (without the PDK 102b going through the hybrid device 1102b).

As shown in FIG. 16, the PDK 102b is similar to the PDK 102 described above with reference to FIG. 2 and includes like components and has similar functionality. The PDK 102b also includes service inheritance storage 1602, feature inheritance storage 1604 and personality inheritance storage 1606. The service inheritance storage 1602, feature inheritance storage 1604 and personality inheritance storage 1606 are used to store information that is provided from the PDK 102b, the first device, and inherited by the second device, the hybrid device 1102b. The PDK 102b is carried by a first user and the PDK 102b has multiple accounts on this first device. For example, the service inheritance information stored in service inheritance storage 1602 includes a first credit card account, a first cell phone account, Wi-Fi access information, and computer A access information. The feature inheritance storage 1604 and personality inheritance storage 1606 are used to store information used for feature and personality inheritance as will be described below. Those skilled in the art will recognize that in another embodiment, the service inheritance storage 1602, the feature inheritance storage 1604 and the personality inheritance storage 1606 is a shared or unified memory space with the service inheritance storage 1602, the feature inheritance storage 1604 and the personality inheritance storage 1606 each being a set of references or pointers to the information in the shared or unified memory space. Those skilled the art will recognize that working memory of the PDK 102b may be used for storing the inheritance information, and that in another embodiment, the PDK 102b need not have service inheritance storage 1602, feature inheritance storage 1604 and personality inheritance storage 1606, but may have only one or two of them.

The hybrid device 1102b is similar to the hybrid device 1102 described above with reference to FIG. 11 and includes like components and has similar functionality. The hybrid device 1102b also includes service inheritance storage 1612, feature inheritance storage 1614 and personality inheritance storage 1616. The hybrid device 1102b is communicatively coupled to the service inheritance storage 1612, feature inheritance storage 1614 and personality inheritance storage 1616. The service inheritance storage 1612, feature inheritance storage 1614 and personality inheritance storage 1616 are also used to store inheritance information specific to the user of the hybrid device 1102b. The service inheritance storage 1612, feature inheritance storage 1614 and personality inheritance storage 1616 are used to store inheritance information received from PDKs, e.g., the PDK 102b. In one embodiment, the hybrid device 1102b is carried by a second user that has a different set of accounts than the user of the first device. For example, the service inheritance information stored in the service inheritance storage 1612 includes a second credit card account, a second cell account, no Wi-Fi access information, and computer B access information. Again, the service inheritance storage 1612, feature inheritance storage 1614 and personality inheritance storage 1616 are portions of working memory of the hybrid device 1102b and the hybrid device 1102b need not have service inheritance storage 1612, feature inheritance storage 1614 and personality inheritance storage 1616, but may have only one or two of them.

In yet another embodiment, the RDC rather than the hybrid device 1102b collects and uses inherited information. For example, in a configuration where there are 2 PDKs, a first PDK and a second PDK, the first PDK links and communicates with an RDC. The first PDK then signals the RDC that inherited information is available from the second PDK. The RDC establish a link with the second PDK and gets the inherited information from the second PDK. This is particularly advantageous because it avoids having to send the inherited data through the hybrid PDK 1102b as shown in FIG. 16. It also allows inheritance to be performed without a hybrid PDK 1102.

The RDC 304b operates as the third device and is used to access or enable a Wi-Fi Service. In this embodiment, the RDC 304b receives inheritance information and uses it to enable or disable the services associate with the RDC 304b. While the RDC 304b does not store the inheritance information, in another embodiment it includes service inheritance storage, feature inheritance storage and personality inheritance storage for doing so.

An example method of using the system 1600 will now be described. Both a first user and a second user are at an airport. A Wi-Fi service is offered in the airport and has RDC 304b controlling access and use of the Wi-Fi service. The first user has and is in possession of the PDK 102b, and the second user has and is in possession of the hybrid device 1102b. The second user with the hybrid device 1102b wants to obtain Wi-Fi access to check email, but the second user doesn't have a Wi-Fi Access account. The first user having the PDK 102b allows the second user to inherit the Wi-Fi access for a one time use. The PDK 102b provides this information to the RDC 304a of the hybrid device 1102b and the hybrid device 1102b stores the inherited information in its service inheritance storage 1612 for use as represented by line 1650. The hybrid device 1102b then communicates with the RDC 304b to access the Wi-Fi service using the first user's account as represented by line 1652. The hybrid device 1102b is able to access and receive the service using the first user's account which it inherited. Depending on the terms with which the information was inherited, the inherited information allows any number of accesses, access for a predetermined amount of time (e.g., for 30 minutes), a single access, or access up to a particular dollar amount of charges.

In another embodiment, the inheritance information is transferred prior to the service being available. For example, the first user is a parent with a debit card account that is associated with or stored in PDK 102b. A child or minor of the parent is associated or in possession of the hybrid device 1102b. The system 1600 allows the first user to transfer to their child, a specific dollar amount that the child could spend. In one embodiment, the money is transferred from PDK 102b to the hybrid device 1102b by transferring account information, a dollar amount and spending restrictions from the service inheritance storage 1602 of PDK 102b to the service inheritance storage 1612 of the hybrid device 1102b. In another embodiment, the actual transfer is done via a backend server (not shown) where the child's device 102b and the hybrid device 1102b are only referenced and the backend server actually carries the charge type and amount available. In yet another embodiment, attributes stored in the hybrid device 1102b and the backend server can be combined to determine the amount and charge types allowed.

The system 1600 is also used to provide feature inheritance. Feature inheritance is similar to service inheritance except feature inheritance is limited to a portion of a service. An example of feature inheritance is where a parent, the first user having the PDK 102b, allows a child, the second user, to play a teen video game or access a specific website while the parent is present. The child is in possession of the hybrid device 1102b, and when in proximity, it enables the computer that has the RDC 304 controlling its use and access to the internet. When the parent is in the room or within proximity of the child, the hybrid device 1102b then acquires permission from the PDK 102b and is then able to pass additional attributes to the RDC 304 of the personal computer or video game that allow a different rating to be in place. When the parent and the PDK 102b leave the room, the child's hybrid device 1102b loses the privileges and the child must return to lower rated games and sites. Those skilled in the art will recognize how the system 1600 may be integrated as part of a DVD player to control what movies may be viewed. If a movie or other video has selective portions of content that are associated with different ratings, the portions of video content that are output depend on a PDK 102 and a hybrid device 1102b and their associated authorizations. This would allow a single DVD and DVD player to present one version of a movie to an adult viewer while providing a different version of a movie to a child. More specifically, violent or mature content would be removed from the version of the movie output by the DVD system when only the child's hybrid device 1102b is present.

The system 1600 is also used to provide personality inheritance. Personality inheritance is where the preferences of a user or holder of a first device are shared with a user or holder of a second device which are then be used to make informed decisions or provide guidance to the second device. For example, assume 2 children who are friends like to play video games. Let's assume that each child is associated with a hybrid device 1102b that accumulates information related to the purchases, rentals, and play of these games (i.e. the game may have an RDC as well). Around Christmas, the 2 friends choose to exchange game related personality information— hybrid device 1102 to hybrid device 1102. Now each friend knows what the other one has played, they type of games they like to play, and if a particular game was rented, purchased, played online, etc. Each friend can now go and purchase, using the information in their hybrid device 1102, a game that they want to give to the other friend for Christmas. In a second example, a work colleague has collected information on the internet related to a specific subject and wants to now share that information with a second colleague. Personality Inheritance can be done via accumulation in the hybrid device 1102, the PDK 102 or via a backend server or both.

The hybrid device 1102*b* is also particularly advantages for automatically disabling a service or feature. The concept of "service and/or feature disability" is to remove a capability when a device is within proximity of a zone. There are conditions where it is highly desirable to disable a function in a portable device. An example is cell phones in movie theatres, or phone cameras in an office building, etc. In these settings, it is possible that the present invention disables or changes the personality or feature set of a device based on the presence of the RDC 304. For example, in a theatre having an associated RDC, any phone that includes the hybrid device 1102 is placed into a vibrate mode, silent mode, or disabled. When the person leaves the theatre, the phone would return to its normal operation. Of course, the user may still need to have their PDK 102 to obtain service, but both of these features can work in conjunction with the other feature. In another example, when an outside vendor attends a meeting for a corporation, his/her cell phone camera is disabled and possibly his/her phone volume is lowered. There are features that can be controlled by the PDK 102, RDC 304 or the hybrid device 1102 located in a corporate office environment. In addition to the switching (or inhibiting) of features when visiting a facility, these same types of attributes can change when any PDK 102, RDC 304 or hybrid device 1102 comes in to proximity of any other PDK 102, RDC 304 or hybrid device 1102. The above examples described how the functionality of a portable device changes depending upon the devices in its vicinity. In addition, the operational state of the fixed (or semi-portable) type of devices could change as well. For example, the parents are watching an R-rated movie and a pre-teen child walks in the room. The movie becomes immediately blocked (or paused) by the display device so that the pre-teen is protected against the content. In another example, an employee of a recreational facility carries an ID badge including a PDK 102. The recreational facility provides areas for access by customers only, not for employees during predefined hours. When an employee gets close to the entrance, their PDK 102 is recognized by the RDC controlling the door locks, and the employee is not permitted into the area.

Finally, the hybrid device 1102 has been described above as being capable of propagating information between the PDK 102 and the RDC 304. Those skilled in the art will recognize that in environments where there are a plurality of hybrid devices 1102, there are any number of communication paths that can be established between the plurality of hybrid devices 1102 by effectively creating a "daisy chain" of PDKs 102 an RDCs 304 to propagate information from one hybrid device 1102 to another. Such a network of hybrid devices 1102 provides the capability for complex decisions and/or capabilities. There can be any number of information and control transfers between devices having an associated hybrid device 102 such as but not limited to portable to portable, portable to fixed, fixed to fixed, and backend equipment. In such an environment, any device with an associated hybrid device 1102 is able to allow, remove, or alter, the features and capabilities of any other device having an associated hybrid device 102 given the proper authority.

Various other modifications, changes and variations which will be apparent to those skilled in the art may be made in the arrangement, operation and details of the method and apparatus of the present invention disclosed herein without departing from the spirit and scope of the invention as defined in the appended claims. Therefore, the scope of the invention should be determined by the appended claims and their legal equivalent.

The invention claimed is:

1. A hybrid device comprising:
   an integrated personal digital key (PDK) for storing local, secured financial information a user and capable of communicating wirelessly with an external receiver-decoder circuit (RDC); and
   an integrated RDC for communicating wirelessly with at least one external PDK within a proximity zone, the integrated RDC coupled to the integrated PDK by a first signal line for communication, the integrated RDC coupled to at least one other component of the hybrid device by a second signal line, one or more of the integrated RDC and integrated PDK enabling one or more of an application, a function, and a service.

2. The hybrid device of claim 1, wherein at least one of the one or more of the application, the function, and the service are enabled at least in part on the hybrid device.

3. The hybrid device of claim 1, wherein at least one of the one or more of the application, the function, and the service are enabled at least in part on a device external to the hybrid device and communicatively coupled to the external RDC.

4. The hybrid device of claim 1, wherein the integrated PDK includes local, secured biometric information for authenticating a user, the biometric information based on one or more of a fingerprint, palmprint, a retinal scan, an iris scan, a photograph, a signature, a voice sample, DNA and RNA.

5. The hybrid device of claim 1, wherein the external PDK stores local, secured financial information.

6. The hybrid device of claim 1, wherein the integrated PDK stores local, secured financial information and at least one of the one or more of the application, the function, and the service enabled completes a financial transaction based on the financial information.

7. The hybrid device of claim 1, wherein the hybrid device is a cell phone.

8. The hybrid device of claim 1, wherein the external PDK is included in jewelry.

9. The hybrid device of claim 1, comprising a storage for inheritance information.

10. The hybrid device of claim 1, wherein the external PDK is included in a watch.

11. A method comprising:
    creating a first wireless link between an integrated receiver-decoder circuit (RDC) of a hybrid device and an external personal digital key (PDK), the hybrid device including an integrated PDK and the integrated RDC, wherein the integrated PDK stores local, secured financial information;
    receiving a first signal at the integrated RDC via the first wireless link from the external PDK;
    generating an enablement signal enabling one or more of an application, a function and a service.

12. The method of claim 11 further comprising:
    sending the enablement signal to the hybrid device, wherein at least one of the one or more of the application, the function, and the service are enabled at least in part on the hybrid device.

13. The method of claim 11 further comprising:
    sending the enablement signal to the hybrid device, wherein at least one of the one or more of the application, the function, and the service are enabled at least in part on a device external to the hybrid device and communicatively coupled to the external RDC.

14. The method of claim 11, wherein the integrated PDK includes local, secured biometric information for authenticating a user, the biometric information based on one or more of a fingerprint, palmprint, a retinal scan, an iris scan, a photograph, a signature, a voice sample, DNA and RNA.

15. The method of claim 11, wherein the external PDK stores local, secured financial information.

16. The method of claim 11, wherein the hybrid device is a cell phone.

17. The method of claim 11, wherein the external PDK is included in jewelry.

18. The method of claim 11, wherein the integrated PDK is electrically coupled to the integrated RDC, and the method further comprises:
creating a second wireless link between the integrated PDK and an external RDC; and
sending the enablement signal from the integrated PDK to the external RDC using the second wireless link, the enablement signal based on financial information stored locally and securely on the integrated PDK and used to complete a financial transaction.

19. The method of claim 11, wherein the first signal includes inheritance information.

20. The method of claim 11, wherein the external PDK is included in a watch.

\* \* \* \* \*